(12) United States Patent
Yoshida

(10) Patent No.: US 7,215,060 B2
(45) Date of Patent: May 8, 2007

(54) ELECTROSTATIC ACTUATOR, ELECTROSTATIC ACTUATOR DRIVING METHOD, ELECTROMECHANICAL TRANSDUCER, WAVEFORM OUTPUT DEVICE AND ELECTRIC ELEMENT

(75) Inventor: Mitsunobu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 10/950,449

(22) Filed: Sep. 28, 2004

(65) Prior Publication Data
US 2005/0104473 A1 May 19, 2005

(30) Foreign Application Priority Data
Sep. 30, 2003 (JP) ............................. 2003-342227
Sep. 30, 2003 (JP) ............................. 2003-342233

(51) Int. Cl.
*H02N 1/00* (2006.01)

(52) U.S. Cl. ...................... 310/309; 318/116; 310/317; 348/374; 359/694; 359/823

(58) Field of Classification Search ................ 310/309, 310/317; 318/116; 348/374; 359/694, 823
See application file for complete search history.

(56) References Cited

U.S. PATENT DOCUMENTS

| | | | | |
|---|---|---|---|---|
| 5,448,413 A * | 9/1995 | Kobayashi et al. | .......... | 359/698 |
| 5,675,444 A * | 10/1997 | Ueyama et al. | ............. | 359/824 |
| 5,973,856 A * | 10/1999 | Kanbara | ...................... | 359/694 |
| 6,084,363 A * | 7/2000 | Mizumoto | .................. | 318/116 |
| 6,611,079 B2 * | 8/2003 | Koga et al. | .................. | 310/309 |
| 6,670,738 B2 * | 12/2003 | Kasahara et al. | ........... | 310/309 |
| 6,680,558 B2 * | 1/2004 | Akiba et al. | ................. | 310/309 |
| 6,717,326 B2 * | 4/2004 | Koga et al. | .................. | 310/309 |
| 6,750,591 B2 * | 6/2004 | Akiba et al. | ................. | 310/309 |
| 6,765,332 B2 * | 7/2004 | Akiba | ........................ | 310/309 |
| 6,774,534 B2 * | 8/2004 | Akiba et al. | ................. | 310/309 |
| 6,781,281 B2 * | 8/2004 | Koga et al. | .................. | 310/309 |
| 6,784,594 B2 * | 8/2004 | Kasahara et al. | ........... | 310/309 |
| 6,806,618 B2 * | 10/2004 | Koga et al. | .................. | 310/309 |
| 6,806,661 B2 * | 10/2004 | Kasahara et al. | ........... | 318/116 |
| 6,815,871 B2 * | 11/2004 | Yuasa et al. | ................. | 310/317 |
| 6,900,576 B2 * | 5/2005 | Koga et al. | .................. | 310/309 |
| 6,924,940 B2 * | 8/2005 | Koga et al. | .................. | 359/694 |
| 6,950,219 B2 * | 9/2005 | Onuki et al. | ................. | 359/253 |

(Continued)

OTHER PUBLICATIONS

Akihiro Koga, et al. "Electrostatic Linear Microactuator Mechanism for Focusing a CCD Camera", Journal of Lightwave Technology by IEEE, vol. 17, No. 1, Jan. 1999, 9 pages.

*Primary Examiner*—Karl Tamai
(74) *Attorney, Agent, or Firm*—Oblon, Spivak, McClelland, Maier & Neustadt, P.C.

(57) ABSTRACT

An electrostatic actuator includes a waveform output register which generates waveform data having a drive time and a drive pattern on the basis of an operation request from the outside and has queues 0 and 1 to 3 holding the waveform data, a waveform data management unit which erases the waveform data held in the queue 0 of the waveform output register after the drive time has elapsed and moves the waveform data held in the queues 1 to 3 to the queue 0, an output waveform generation unit which generates a corresponding waveform signal on the basis of the drive pattern held in the queue 0 of the waveform output register, and a switching circuit which converts the inputted drive pattern into voltage to electrode substrate.

13 Claims, 24 Drawing Sheets

U.S. PATENT DOCUMENTS

| | | | |
|---|---|---|---|
| 7,095,565 B2 * | 8/2006 | Koga et al. | 359/694 |
| 7,142,344 B2 * | 11/2006 | Onuki et al. | 359/253 |
| 2003/0057802 A1 * | 3/2003 | Koga et al. | 310/309 |
| 2003/0122447 A1 * | 7/2003 | Akiba | 310/309 |
| 2004/0012300 A1 * | 1/2004 | Kasahara et al. | 310/309 |
| 2004/0036379 A1 * | 2/2004 | Kasahara | 310/309 |
| 2004/0119870 A1 * | 6/2004 | Yoshida et al. | 348/335 |
| 2004/0130639 A1 * | 7/2004 | Koga et al. | 348/294 |
| 2004/0212274 A1 * | 10/2004 | Koga et al. | 310/309 |
| 2005/0102045 A1 * | 5/2005 | Yoshida | 700/61 |
| 2005/0104473 A1 * | 5/2005 | Yoshida | 310/309 |
| 2005/0218940 A1 * | 10/2005 | Yoshida | 327/106 |
| 2005/0225179 A1 * | 10/2005 | Yoshida | 307/143 |
| 2005/0253481 A1 * | 11/2005 | Koga et al. | 310/309 |
| 2006/0055282 A1 * | 3/2006 | Sekimura | 310/309 |
| 2006/0066174 A1 * | 3/2006 | Akiba et al. | 310/309 |
| 2006/0066959 A1 * | 3/2006 | Koga et al. | 359/694 |
| 2006/0097672 A1 * | 5/2006 | Koga et al. | 318/116 |
| 2006/0209427 A1 * | 9/2006 | Akiba et al. | 359/694 |
| 2006/0267450 A1 * | 11/2006 | Matsuki | 310/309 |

* cited by examiner

```
1.   module queue ( CLK, WE, WD, RE, RD ) ;
2.   input          CLK;
3.   input          WE;
4.   input   [19:0] WD;
5.   input          RE;
6.   output  [19:0] RD;
7.   reg     [19:0] RD;
8.   reg     [19:0] data_reg [0:7];
9.   reg     [ 3:0] w_adr;
10.  reg     [ 3:0] r_adr;
11.  wire           w_allow = WE;
12.  wire           r_allow = RE;
13.  wire    [ 2:0] w_index = w_adr [2:0];
14.  wire    [ 2:0] r_index = r_adr [2:0];
15.  always @ (posedge CLK) begin
16.  if (w_allow) w_adr < = w_adr +1;
17.  end
18.  always @ (posedge CLK) begin
19.  if (w_allow) data_reg [w_index] < = WD;
20.  end
21.  always @ (posedge CLK) begin
22.  if (r_allow) r_adr < = r_adr +1;
23.  end
24.  always @ (posedge CLK) begin
25.  if (r_allow) RD < = data_reg [r_index];
26.  end
27.  endmodule
```

FIG. 8

```
1.   module queue ( CLK, RST, MAX, ENA ) ;
2.   input          CLK;
3.   input          RST;
4.   input   [7:0]  MAX;
5.   output         ENA;
6.   reg     [7:0]  cnt_reg;
7.   always @ (posedge CLK) begin
8.   if (RST) cnt_reg < = 0;
9.   else     cnt_reg < = cnt_reg + 1;
10.  end
11.  assign ENA = (cnt_reg == MAX);
12.  endmodule
```

FIG. 9

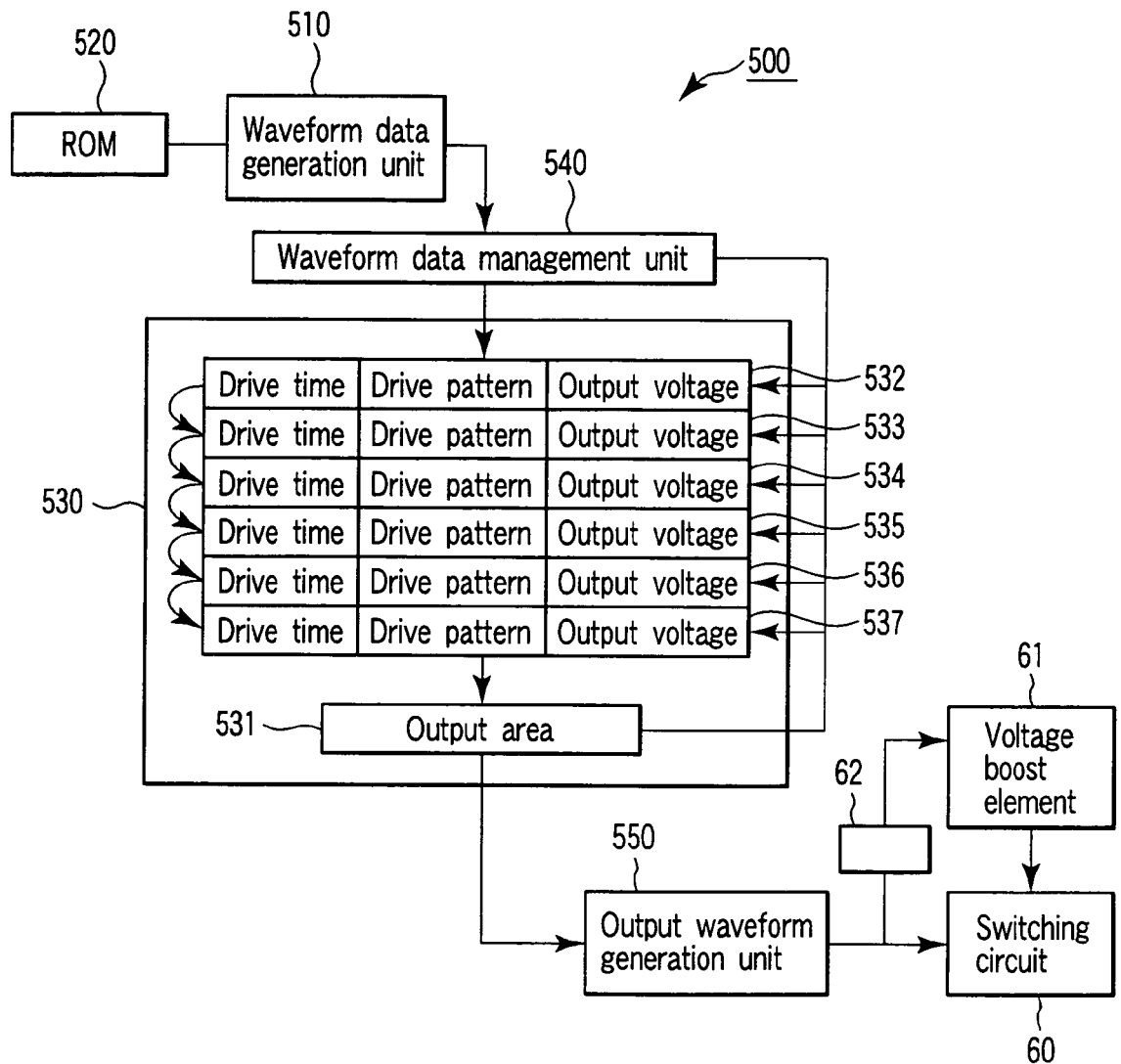
F I G. 14

ELECTROSTATIC ACTUATOR, ELECTROSTATIC ACTUATOR DRIVING METHOD, ELECTROMECHANICAL TRANSDUCER, WAVEFORM OUTPUT DEVICE AND ELECTRIC ELEMENT

CROSS-REFERENCE TO RELATED APPLICATIONS

This application is based upon and claims the benefit of priority from prior Japanese Patent Applications No. 2003-342227, filed Sep. 30, 2003; and No. 2003-342233, filed Sep. 30, 2003, the entire contents of both of which are incorporated herein by reference.

BACKGROUND OF THE INVENTION

1. Field of the Invention

The present invention relates to an electrostatic actuator, an electrostatic actuator driving method, an electromechanical transducer, a waveform output device, and the electromechanical transducer and an electric element in which the waveform output device is incorporated, particularly to those in which high-accuracy control can be performed while power consumption can be reduced.

2. Description of the Related Art

The electrostatic actuator which generates electrostatic force between a stator and movable element constituting the actuator to drive the movable element by repulsion/attraction of the electrostatic force, is well known (see Jpn. Pat. Appln. KOKAI Publication No. 8-140367 and Jpn. Pat. Appln. KOKAI Publication No. 10-239578). As shown in FIG. 39, the electrostatic actuator includes an MPU (waveform data generation unit) 2001, a waveform output register 2002, an output waveform generation unit 2003, a switching circuit 2004, and an actuator (stator and movable element) 2005. FIG. 40 shows a process of inputting data to the waveform output register 2002 on the basis of a control program stored in a program ROM 2006.

In the electrostatic actuator, as shown in FIG. 41, a current position and a drive direction of the actuator (the current position and the drive direction of a movable element relative to a stator) are calculated by combining a control program and the MPU 2001 (ST1). An appropriate waveform data (drive time and drive pattern) is extracted from a waveform data string on the program ROM 2006 to set the waveform data in the waveform output register 2002 (ST2). The output waveform generation unit 2003 generates the waveform data on the basis of the waveform data set in the waveform output register 2002. The switching circuit 2004 converts the waveform data into voltage and the voltage is applied to electrodes provided in the actuator (movable element and stator).

It is decided whether the predetermined drive time has elapsed or not (ST3). When the predetermined drive time has elapsed, in accordance with the current position and drive direction of the actuator, the appropriate waveform data is set into the waveform output register 2002 from the waveform time data string in order to output the next waveform data.

In addition to the electrostatic actuator, the electromechanical transducer such as a piezoelectric actuator is known as the device in which drive force is generated by applying the voltage (Jpn. Pat. Appln. KOKAI Publication No. 2001-119917 and Jpn. Pat. Appln. KOKAI Publication No. 2002-27767).

The following problem exists in the electrostatic actuator and the electrostatic actuator driving method. Namely, in order to correctly generate the waveform data to a set minimum waveform unit time (for example, 0.1 ms to 1 ms), it is necessary to suppress the step of calculating the current position and the drive direction of the movable element to a sufficiently small value (for example, not more than $\frac{1}{1000}$) relative to required resolution (0.1 ms) of the drive waveform. In order to realize the requirement, it is necessary to drive the MPU at extremely high speed. For example, when about 3000 clocks are necessary to calculate the current position and drive direction of the movable element, the clock of 300 MHz is required for the MPU. In such high-speed clock, power consumption is increased in the MPU, and the high-speed clock is not appropriate to mobile applications in which there is little margin in the power source.

There is known the control unit which controls actuators such as the electrostatic actuator, the piezoelectric actuator, and a stepping motor and electronic devices such as LED using the waveform signal. FIG. 42 shows an example of the control devices. FIG. 42 shows a configuration of a general purpose processor having a parallel output port (for example, see Jpn. Pat. Appln. KOKAI Publication No. H6-277894). An MPU 2010 performs processing by reading a command set of a program RAM 2011. The MPU 2010 writes the data in an output data register 2012 if necessary, and the MPU 2010 transmits the data to an output waveform generation unit 2013. The output waveform generation unit 2013 transmits the waveform signal to a switching circuit (not shown) to drive the actuator or the like. The MPU 2010 has a timer inside MPU 2010 to perform time management. When the MPU having the parallel output port is used, the control device can be easily formed because the MPU 2010 can perform the time management by itself.

FIG. 43 shows another example of the control devices. FIG. 43 shows the configuration of the control circuit of the stepping motor (for example, see Jpn. Pat. Appln. KOKAI Publication No. 2000-94569). A control unit 2020 decides a drive direction (CW/CCW) bit for determining a rotation direction of the stepper, and the control unit 2020 also decides whether a stepping motor 2023 is operated in a half step or a full step. The control unit 2020 outputs a half step mode (HSM) bit and a STEP bit in which one step provides a direction of the generation at each negative edge of a STEP signal. A waveform data generation unit 2021 generates a specific sequence from the three bits and outputs the sequence to ports PA1 to PB2. The waveform data generation unit 2021 prepares four types of drive patterns, and the waveform data generation unit 2021 has a function of controlling which sequence is invoked depending on the state of a flag. A switching circuit 2022 receives the output data (TTL level, e.g. 3.3V) of the waveform data generation unit 2021 to output current (for example, 500 mA) having a voltage level (for example, 10V) necessary to drive the stepping motor 2023. There are many digital still camera lens actuator using the stepping motor controller.

The following problem exists in the control device which outputs the waveform signal. Namely, when the processing device (MPU) simultaneously performs time management and waveform management, it is necessary that the MPU should be driven at high speed in order to perform the time management with high accuracy. Specifically, in order to correctly generate the drive pattern to the set minimum waveform unit time (for example, 0.1 ms to 1 ms), it is necessary to suppress the step of calculating the current position and the drive direction of the movable element to the sufficiently small value (for example, not more than $\frac{1}{1000}$) relative to required resolution (0.1 ms) of the drive waveform.

Accordingly, when about 3000 clocks are necessary to calculate the current position and drive direction of the movable element, the clock of 300 MHz is required for the MPU. When such high-speed clock is used, the power consumption is increased in the MPU. As a result, there is the problem that the high-speed clock is not appropriate to mobile applications in which there is little margin in the power source. Since, usually, the system clock is of the order of 10 MHZ, it is difficult to correctly perform the time management by the above-described configuration.

Since periodic ON/OFF signal having a plurality of different phases is used in the stepping motor controller, several types of output waveform patterns are previously determined. On the other hand, in the general purpose actuator (electrostatic actuator), the huge number of drive patterns can be generated depending on the form of the actuator (auto-focusing, zooming, and other applications). Therefore, since the configuration of the controller significantly depends on the form of the actuator, it is difficult that all the drive sequences are previously installed in the controller. Since the general purpose actuator is not compatible with the drive sequence which is not previously assumed, there is the problem that the drive sequence of the general purpose actuator is not compatible when the configuration of hardware (the number of input terminals) of the actuator is changed after a chip has been developed.

BRIEF SUMMARY OF THE INVENTION

In view of the foregoing, it is an object of the invention to provide the electrostatic actuator, the electrostatic actuator driving method, the electromechanical transducer, the waveform output device, the electromechanical transducer, and the electric element, in which the power consumption can be reduced without operating the MPU at high speed even if the high-accuracy drive is performed.

According to one aspect of the present invention, there is provided an electrostatic actuator comprising An electrostatic actuator comprising, a stator having an electrode substrate, a movable unit having at least one movable element, which is guided by the stator to be able to be reciprocated in a predetermined direction and is provided with an electrode arranged opposite to the electrode substrate, a waveform data generation unit which generates waveform data having at least a drive time and a drive pattern on the basis of an operation request from the outside, a waveform output register having an output area and a buffer area, which hold the waveform data, a waveform data management unit which writes the waveform data generated by the waveform data generation unit in the buffer area, erases the waveform data held in the output area of the waveform output register after the drive time has elapsed, and moves the waveform data held in the buffer area to the output area, an output waveform generation unit which generates a corresponding waveform signal on the basis of the drive pattern held in the output area of the waveform output register and a switching circuit which converts the waveform signal into voltage to the electrode substrate.

BRIEF DESCRIPTION OF THE SEVERAL VIEWS OF THE DRAWING

FIG. 8 is an explanatory view in which the queue shown in FIG. 1 is described by Verilog-HDL Language;

FIG. 9 is an explanatory view in which the counter shown in FIG. 2 is described by Verilog-HDL Language;

FIG. 14 is a block diagram showing an actuator control unit according to a sixth embodiment of the invention;

DETAILED DESCRIPTION OF THE INVENTION

Figure 1:
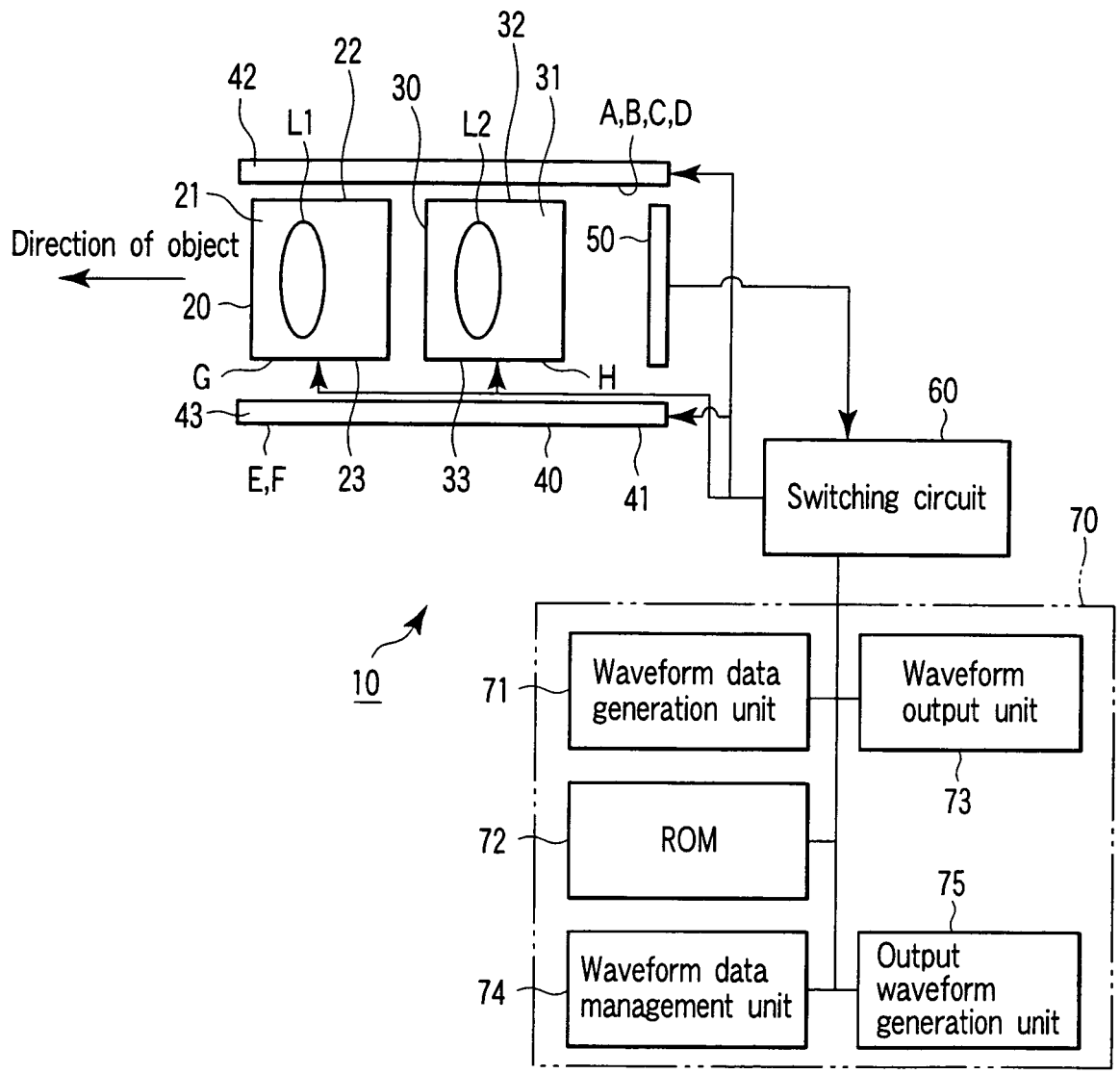
FIG. 1 shows a schematic configuration of an electrostatic actuator according to a first embodiment of the invention.

FIG. 1 shows a schematic configuration of an electrostatic actuator 10 according to a first embodiment of the invention, and FIG. 2 shows a control flow in an actuator control unit 70.

The electrostatic actuator 10 includes a first movable element 20 and a second movable element 30, a stator 40, an image pickup device 50 imaged by the later-mentioned lenses L1 and L2, a switching circuit 60 which provides voltage to the first movable element 20, the second movable element 30, and the stator 40, and an actuator control unit 70 which controls the switching circuit 60.

The first movable element 20 and the second movable element 30 are formed in a substantially rectangular solid having a hollow portion. A camera module incorporated into a miniature electronic device or the like is formed by the electrostatic actuator 10.

The first movable element 20 holds the lens L1 and includes a movable element main body 21 formed in the shape of the substantially rectangular solid. A pair of electrode planes 22 and 23 are formed in the movable element main body 21. The pair of electrode planes 22 and 23 are opposite to the later-mentioned electrode substrates 42 and 43 of the stator 40, and a convex stripe electrode (G) is formed in the pair of electrode planes 22 and 23 respectively.

The second movable element 30 holds the lens L2 and includes a movable element main body 31 formed in the shape of the substantially rectangular solid. A pair of electrode planes 32 and 33 are formed in the movable element main body 31. The pair of electrode planes 32 and 33 are opposite to the later-mentioned electrode substrates 42 and 43 of the stator 40, and a convex stripe electrode (H) is formed in the pair of electrode planes 32 and 33 respectively.

A stator frame 41 and the electrode substrates 42 and 43 are formed in the stator 40. The electrode substrates 42 and 43 are attached to surfaces opposite to the electrode planes 22, 23, 32 and 33. In the electrode substrate 42 and 43, stripe-shaped electrodes (A to F) are formed in the electrode planes opposite to the first movable element 20 and the second movable element 30.

The switching circuit 60 has a function of converting the inputted waveform data into the voltage applied to the electrode substrates 21, 22, 42 and 43. Namely, 1/0 of each bit of the waveform corresponds to High/Low of the voltage provided to the electrodes.

The actuator control unit 70 includes a waveform data generation unit 71, a ROM 72 in which a control program is stored, a waveform output register 73, a waveform data management unit 74, and an output waveform generation unit 75. A queue 0 (output area) and queues 1 to 3 (buffer area) are provided in the waveform output register 73. The queue 0 and the queues 1 to 3 include a TIME register 73a and a DATA register 73b respectively (see FIG. 4). The waveform data generation unit 71 and the output waveform generation unit 75 are driven by the independent MPU respectively.

Figure 2A:
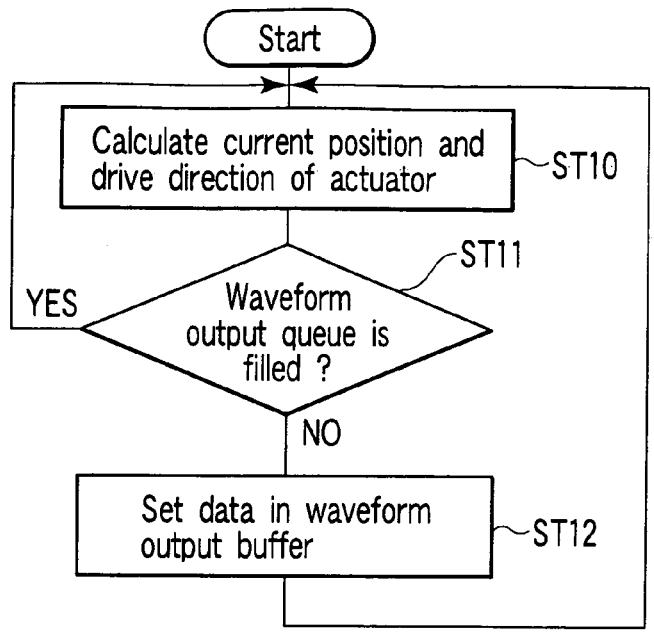
FIGS. 2A and 2B show control flows in an actuator control unit incorporated into the electrostatic actuator.
Figure 2B:
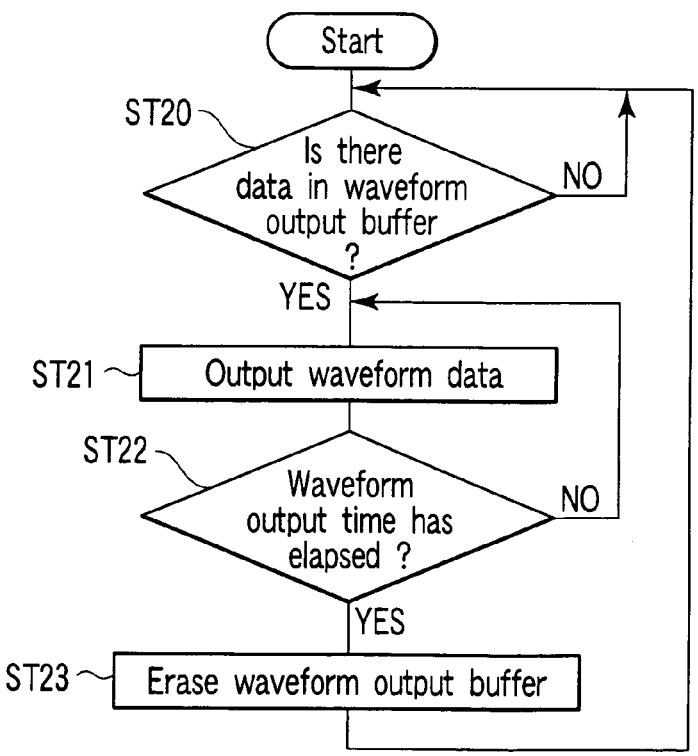

FIG. 2 shows a control flow in the actuator control unit 70, FIG. 2A is the control flow of the waveform data generation unit 71, and FIG. 2B is the control flow of the waveform data management unit 74.

The waveform data generation unit 71 calculates the current position and the drive direction of the actuator (ST10). Then, it is decided whether the queues 0 to 3 of the waveform output register 73 are filled or not (ST11). When the queues 0 to 3 are filled, the control flow returns to ST10. When the queues 0 to 3 are not filled, the waveform data is set in the queue 3 of the waveform output buffer 73 (ST12), and the control flow returns to ST10.

In the waveform data management unit 74, it is decided whether the waveform data exists in the queue 0 of the waveform register 73 or not (ST20). When the waveform data does not exist in the queue 0, the control flow becomes a waiting state. When the waveform data exists in the queue 0, the waveform data which exists in the queue 0 is outputted (ST21). Then, it is decided whether waveform output time specified in the waveform data of the queue 0 has elapsed or not (ST22). When the waveform output time has not elapsed, the control flow returns to ST21. When the waveform output time has elapsed, the waveform data which exists in the queue 3 of the waveform output register 73 is erased (ST23). Then, the control flow returns to ST20.

Figures 3, 4:
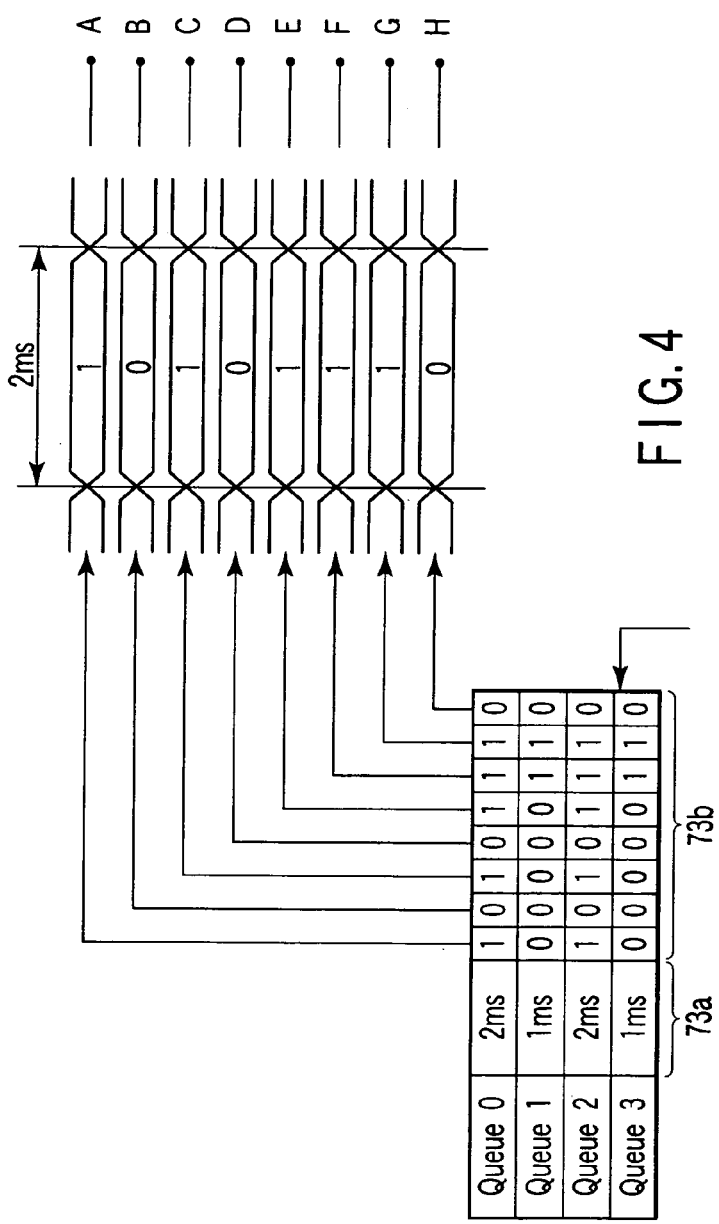
FIG. 3 shows an example of waveform data for directing a holding state of a movable element in the actuator control unit.
FIG. 4 is an explanatory view showing a relationship between waveform data and waveform generation data within a waveform output register in the actuator control unit.
Figure 5:
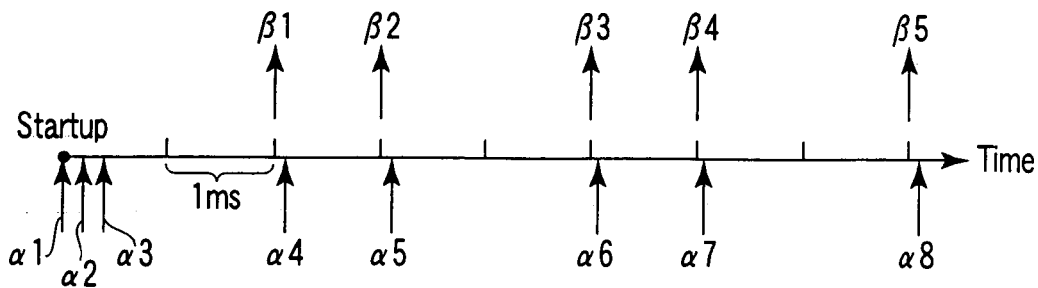
FIG. 5 is an explanatory view showing schematically a state of data-input/data-output to/from the waveform output register in the actuator control unit.

The electrostatic actuator 10 having the above-described configuration is driven as below. The minimum waveform unit time is set for the actuator 10, in accordance with the size and driven speed of the actuator 10, the frequency of the system clock signal, and the like. In the embodiment of FIGS. 3 and 4, the unit time is set to 1 ms. FIG. 3 shows an example of the waveform data, FIG. 4 is an explanatory view showing a relationship between the waveform data and the waveform generation data within the waveform output register in the actuator control unit 70, and FIG. 5 is an explanatory view showing schematically the state of data-input/data-output to/from the waveform output register 73 after 8 ms from the startup.

When the electrostatic actuator 10 is started up, the startup operation is performed by the actuator control unit 70. The waveform data does not exist in the queues 0 to 3 of the waveform output register 73 when the electrostatic actuator 10 is started up.

Immediately after the startup, the electrostatic actuator 10 is set so as to perform holding operation of the movable elements 20 and 30, and the waveform data shown in FIG. 3 is inputted to the queue 3 of the waveform output register 73. The waveform data inputted to the queue 3 is immediately transmitted to the queue 2, the queue 1, and the queue 0, and the data input ($\alpha 1$ to $\alpha 3$) is performed until the queues 0 to 3 of the waveform output register 73 are filled. When the 2 ms has passed, the initial waveform data in the queue 0 is automatically outputted ($\beta 1$), the waveform data of the queue 1 is moved to the queue 0, the waveform data of the queue 2 is moved to the queue 1, the waveform data of the queue 3 is moved to the queue 2, and the queue 3 becomes empty. Then, the waveform data management unit 74 directs the waveform data generation unit 71 to input the data ($\alpha 4$), and one piece of waveform data is inserted into the queue 3 of the waveform output register 73. The data output ($\beta 2$, $\beta 3$, $\beta 4$, $\beta 5$, . . . ) is performed, and the data input ($\alpha 5$, $\alpha 6$, $\alpha 7$, $\alpha 8$, . . . ) is performed each time the queue 3 becomes empty.

1/0 of each bit of the drive pattern outputted from the waveform output register 73 corresponds to High/Low voltage of the electrodes of the stator 40 or the movable elements 20 and 30. 1/0 is converted into High/Low voltage by the switching circuit 60, and High/Low voltage is applied to the electrodes (A to H) of the movable elements 20 and 30 and the stator 40.

The waveform data management performed in parallel with the operation of the waveform data generation unit 71 is performed by the waveform data management unit 74, while the queues 1 to 3 acting as the buffer area are provided in the waveform output register 73. Therefore, a margin can be generated in the operation of the waveform data generation unit 71 which calculates the current position and the drive direction of the actuator.

For example, a clock required for generation of the waveform pattern with accuracy of 1 µs becomes 1 MHz. When at least two-stage queues are provided in the waveform output register 73, the current position and the drive direction of the actuator can be calculated within the minimum waveform unit time. Assuming that the minimum waveform unit time is set to 0.1 ms and about 3000 clocks are required to calculate the current position and the drive direction of the actuator, when a theoretical value is determined, the minimum requirement of the clock becomes 0.3 MHz. Therefore, it is possible that the clock (0.3 MHz) required for the step of calculating the current position and the drive direction of the actuator is lower than the clock (1 MHz) required for the step of generating the waveform pattern, which allows the power consumption to be reduced as compared with the case where the buffer is not provided in the waveform output register 73.

As the minimum waveform unit time is increased, the minimum requirement of the clock is reduced. For example, when the minimum waveform unit time is set to 0.5 ms, the minimum requirement of the clock is further reduced to as low as 60 KHz.

As described above, in accordance with the electrostatic actuator 10 of the embodiment, since the waveform data management unit 74 is provided while the queue is provided as the buffer in the waveform output register 73, even if resolution of the waveform data is increased to perform the drive with high accuracy, it is not necessary that the waveform data generation unit 71 is operated at high speed for the step of calculating the current position and the drive direction of the actuator, and the power consumption can be reduced.

The buffer area is formed in the multi stages in the waveform output register 73. Therefore, the data input is always performed at the uppermost stage of the buffer area, and the movement of the data from the buffer area to the output area is always from the lowermost stage. After the movement of the data from the buffer area to the output area is performed, all the pieces of waveform data are lowered by one stage. Namely, the data input position and the data output position are specified, so that the embodiment has an advantage that the module is easily formed.

While the ROM is set as the storage unit of the control program in the electrostatic actuator 10, it is also possible that the RAM is set as the storage unit of the control program.

Figure 6:
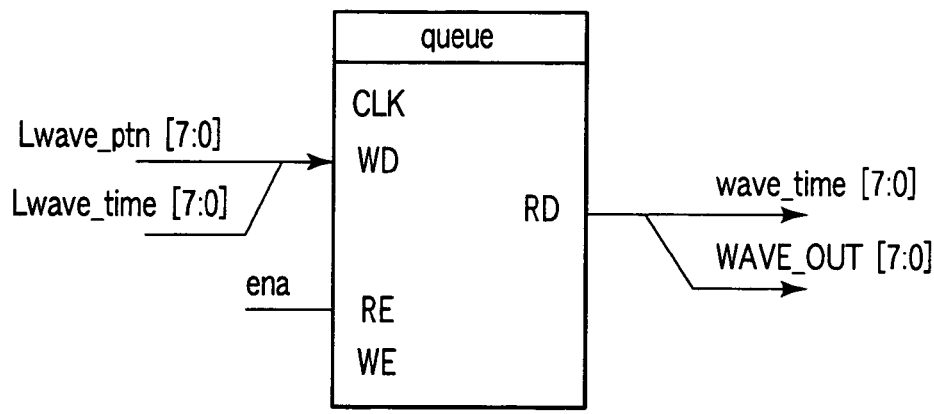
FIG. 6 is a block diagram showing a queue holding the waveform data in an output waveform generation unit.

The configuration and the operation of the queues 0 to 3 will be described in detail. FIG. 6 is a block diagram showing the queues 0 to 3 holding the waveform data in the waveform output register 73. The input to the queues 0 to 3 includes write data WD, a write permission signal WE, a read permission signal RE, and a clock CLK. A size of the data stored in the queues 0 to 3 is monitored, and write permission is given to the queues 0 to 3 when the data sizes of the queues 0 to 3 do not exceed the queue sizes. At this point, the write permission signal WE becomes 1 to perform the write in the queues 0 to 3. The data of the TIME register 73a (drive time register) and the data of the DATA register 73b (drive data register) are transmitted to the queue module as i_wave_time data and i_wave_ptn data respectively. In this case, the i_wave_time data and i_wave_ptn data are set to eight bits.

At the time when the write is performed in the queues 0 to 3, i_wave_ptn is expanded to 16 bits to generate the data in which i_wave_time is retained in the higher-order eight bits. The data becomes the write data WD to the queues 0 to 3. When the data readout from the queues 0 to 3 is permitted, i.e. when the read permission signal RE becomes 1, output data RD from the queues 0 to 3 is updated. The lower-order eight bits in the output data RD from the queues 0 to 3 become the drive data outputted from the waveform output device. The higher-order eight bits in the output data RD from the queues 0 to 3 become the input data to a counter which manages the time for outputting the drive data.

Figure 7:
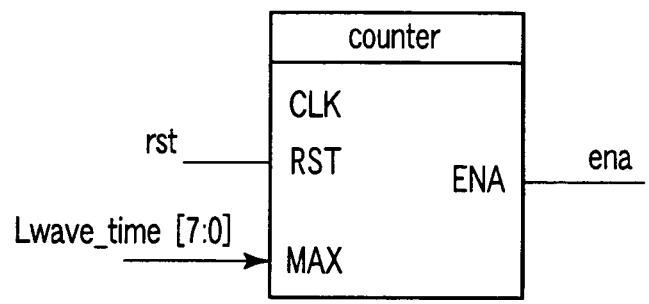
FIG. 7 is a block diagram showing a counter which manages time for outputting drive data.

FIG. 7 is a block diagram showing the counter which manages the time for outputting the drive data. The input to the counter includes a count value MAX, a reset signal RST for directing counter start, and a clock CLK. The output of the counter is an enabled signal ENA. The enabled signal ENA becomes 1 only when the value inside the counter corresponds to the count value MAX, and the enabled signal ENA is 0 except that the value inside the counter corresponds to the count value MAX. The higher-order eight bits (wave_time) in the output data RD of the queues 0 to 3 are inputted to the count value MAX of counter, and the output signal ENA from the counter is connected to the data read permission signal RE of the queues 0 to 3. When an rst signal is inputted to the input RST of the counter, output data WAVE_OUT is outputted for a predetermined time wave_time and then the new data can be read from the queues 0 to 3. The rst signal becomes 1 after one clock of the output signal ENA from the counter, and the rst signal is 0 in other cases.

FIG. 8 shows an example in which the queues 0 to 3 shown in FIG. 6 are described by Verilog-HDL Language. A module name and input/output variables to the module are declared in the first line. Whether a bit width and the variables of input/output data to the module are the input data or the output data is declared in the second to sixth lines. The register utilized in the queue module is declared in the seventh to tenth lines. In this case, the queue having eight stages and 20 bits is declared in the eighth line. The write address is declared in the ninth line and read address is declared in the 10th line. The register data and the input/output variables are declared again as internal variables in the 11th to 14th lines. In the 15th to 17th lines, a writable index w_adr in the queue array is updated (increment of index) when the write permission signal WE becomes valid. When the write permission is given while the index is seven, because the index w_adr has only the data width of three bits, one increment is performed and the index returns to 0. In the 18th to 20th lines, the process of retaining the actual data in the queue is described when the write permission is given (write permission signal WE becomes 1). In the 21st to 23rd lines, a read index is incremented when the read permission is given from the queue. In 24th to 26th lines, the process of outputting the actual data from the queues 0 to 3 is described when the read permission is given from the queue (read permission signal RE becomes 1).

FIG. 9 shows an example in which the counter shown in FIG. 7 is described by Verilog-HDL Language. The module name and the input/output variables to the module are declared in the first line. Whether the bit width and the variables of the input/output data to the module are the input data or the output data is declared in the second to fifth lines. The register utilized in the queue module is declared in the sixth line. In this case, the counter register utilized inside the counter is declared in the sixth line. The process of actually performing the count inside the counter is described in the seventh to 10th lines. When the reset signal RST is inputted, the counter returns to 0 (eighth line). In other cases, the counter is incremented in each rising edge of the clock. The process of outputting the counter is described in 11th line. The enabled signal ENA becomes 1 only when the count value of the internal counter is equal to the count value MAX.

Figure 10:
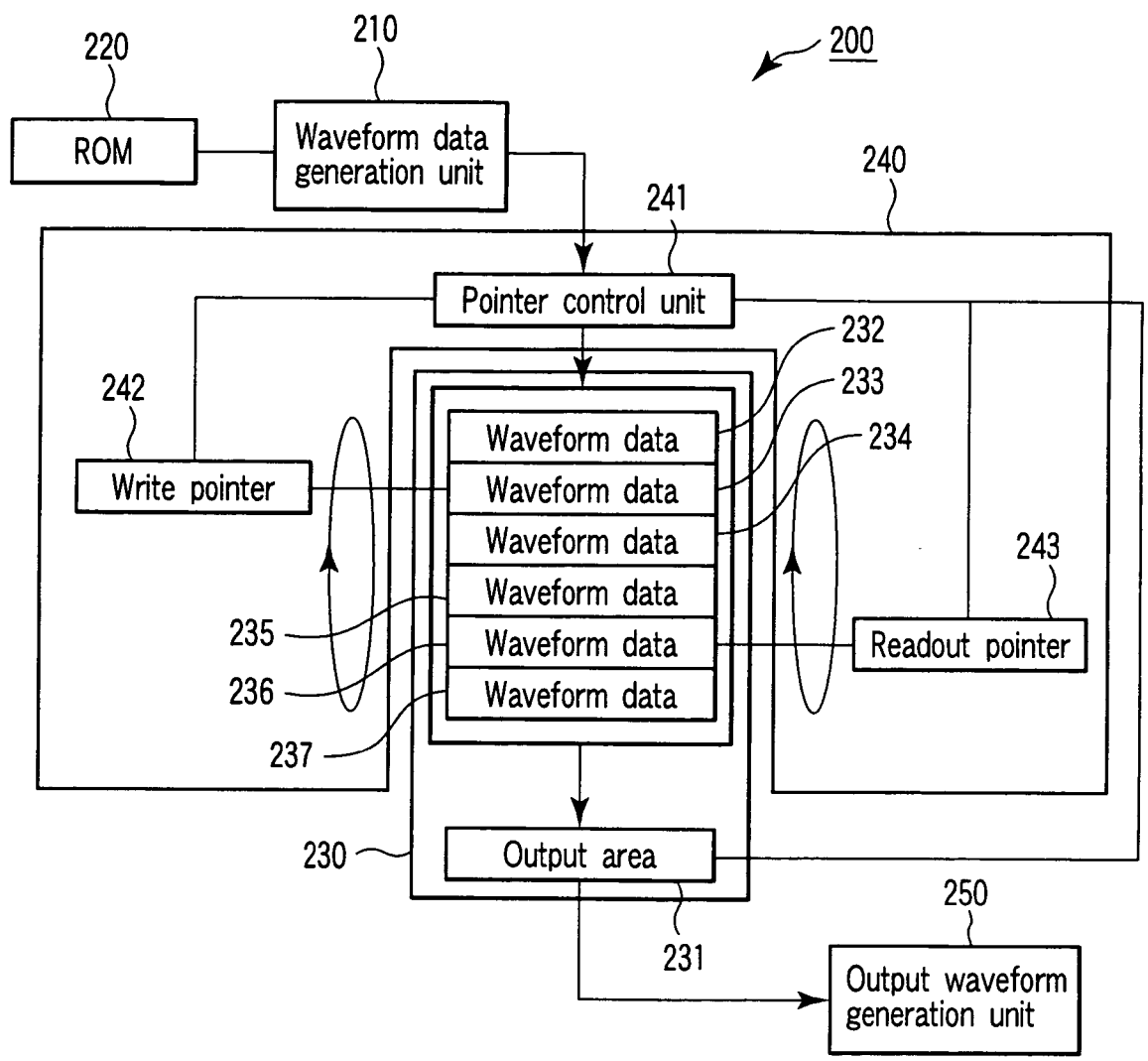
FIG. 10 is a block diagram showing an actuator control unit according to a second embodiment of the invention.

FIG. 10 is a block diagram showing an actuator control unit 200 according to a second embodiment of the invention. Similarly to the above-described actuator control unit 70, the actuator control unit 200 is incorporated into the electrostatic actuator 10. In the actuator control unit 200, a technique referred to as ring buffer is adopted.

The actuator control unit 200 includes a waveform data generation unit 210, a ROM 220 in which the control program is stored, a waveform output register 230, a waveform data management unit 240, and an output waveform generation unit 250. An output area 231 and buffer areas 232 to 236 are provided in the waveform output register 230.

The waveform data management unit 240 includes a pointer control unit 241, a write pointer 242, and a read pointer 243c. The pointer control unit 241 has the function of writing the waveform in the buffer areas 232 to 237 and the function of moving the waveform data written in the buffer areas 232 to 237 to the output area 231. The pointer control unit 241 also has the function of controlling a write position and a read position by moving the write pointer 242 and the read pointer 243 in writing or moving the waveform data respectively.

The write pointer 242 has the function of controlling the write position into the buffer areas 232 to 237. When the waveform data is written in one of the buffer areas 232 to 237 which is currently pointed by the write pointer 242, the write pointer 242 proceeds by one. The read pointer 243 has the function of controlling the read position from the buffer areas 232 to 237. When the waveform data is read from one of the buffer areas 232 to 237 which is currently pointed by the read pointer 243 and moved to the output area 231, the read pointer 243 proceeds by one. The write pointer 242 and read pointer 243 are moved to the buffer area 232 in the uppermost stage after moving to the buffer area 237 in the final stage.

The actuator control unit 200 having the above-described configuration transmits the waveform signal to the switching circuit 60 as described below. In the waveform data generation unit 210, the waveform data is generated in the same manner as the waveform data generation unit 71. The waveform data management unit 240 writes the waveform data, e.g. in the buffer area 233 pointed by the write pointer 242 among the buffer areas 232 to 237, and the waveform data management unit 241 moves the write pointer 242 to the buffer area 234.

At the time when the predetermined drive time has elapsed, the waveform data management unit 240 erases the waveform data in the output area 231 and moves the waveform data in the buffer area 236 which is pointed by the read pointer 243 among the buffer areas 232 to 237 to the output area 231. The output waveform generation unit 250 generates the waveform signal on the basis of the waveform data stored in the output area 231 to input the waveform signal to the switching circuit 60.

When the specific waveform data is repeatedly used, the generation of the waveform data is not required in each case by pointing the constant buffer area with the read pointer 243, so that the margin can be generated in the operation of the waveform data generation unit 210.

In accordance with the actuator control unit 200 of the second embodiment, similarly to the actuator control unit 70, even if the resolution of the waveform data is increased to perform the drive with high accuracy in controlling the electrostatic actuator 10, by providing the buffer areas 232 to 237 in the waveform output register 230, it is not necessary that the waveform data generation unit 210 is operated at high speed for the step of calculating the current position and the drive direction of the actuator, and the power consumption can be reduced. The waveform data management unit 240 specifies the buffer area in which the waveform data is written and the buffer area from which the waveform data is read in each case, so that it is not necessary to move the waveform data between the buffer areas and the operation can be simplified.

Figure 11:
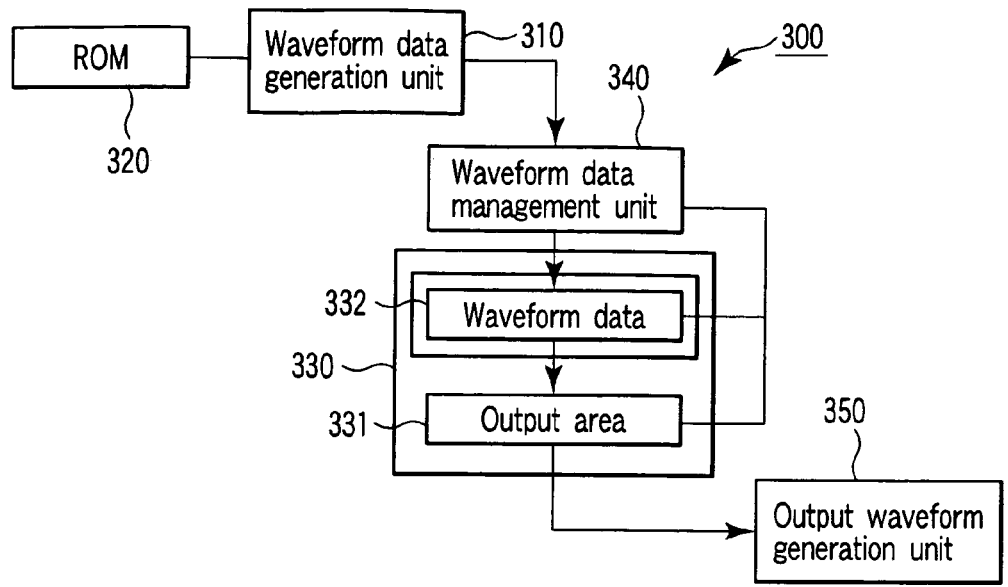
FIG. 11 is a block diagram showing an actuator control unit according to a third embodiment of the invention.

FIG. 11 is a block diagram showing an actuator control unit 300 according to a third embodiment of the invention. Similarly to the actuator control unit 70, the actuator control unit 300 is incorporated into the electrostatic actuator 10. In the actuator control unit 300, the technique referred to as double buffer is adopted.

The actuator control unit 300 includes a waveform data generation unit 310, a ROM 320 in which the control program is stored, a waveform output register 330, a waveform data management unit 340, and an output waveform generation unit 350. An output area 331 and a buffer area 332 are provided in the waveform output register 330.

The waveform data management unit 340 inputs the waveform data in the buffer area 332 of the waveform output register 330. When the output area 331 is empty, the waveform data management unit 340 moves the waveform data in the buffer area 332 to the output area 331. When the specified waveform output time has elapsed in the waveform data of the output area 331, the waveform data management unit 340 erases the waveform data and moves the waveform data stored in the buffer area 332 to the output area 331.

The actuator control unit 300 having the above-described configuration transmits the waveform signal to the switching circuit 60 as described below. Namely, the waveform data generation unit 310 generates the waveform data in the same manner as the waveform data generation unit 71.

The waveform data management unit 340 writes the waveform data generated by the waveform data generation unit 310 in the buffer area 332. At this point, when the output area 331 is empty, the waveform data management unit 340 moves the waveform data in the buffer area 332 to the output area 331. The waveform signal is outputted with the predetermined drive pattern for a predetermined drive time on the basis of the waveform data stored in the output area 331.

When the specified waveform output time has elapsed in the waveform data of the output area 331, the waveform data management unit 340 erases the waveform data and moves the waveform data stored in the buffer area 332 to the output area 331. Similarly, the waveform signal is outputted with the predetermined drive pattern for the predetermined drive time.

In accordance with the actuator control unit 300 of the third embodiment, similarly to the actuator control unit 70, even if the resolution of the waveform data is increased to perform the drive with high accuracy in controlling the electrostatic actuator 10, by providing the buffer area 332 in the waveform output register 330, it is not necessary that the waveform data generation unit 310 is operated at high speed for the step of calculating the current position and the drive direction of the actuator, and the power consumption can be reduced. Since the buffer area is small, the third embodiment is effective for the case in which the sufficient space is not secured due to the limitation of the chip size. Further, since the data movement between sub-buffers is not generated, the power consumption can be reduced.

Figure 12:
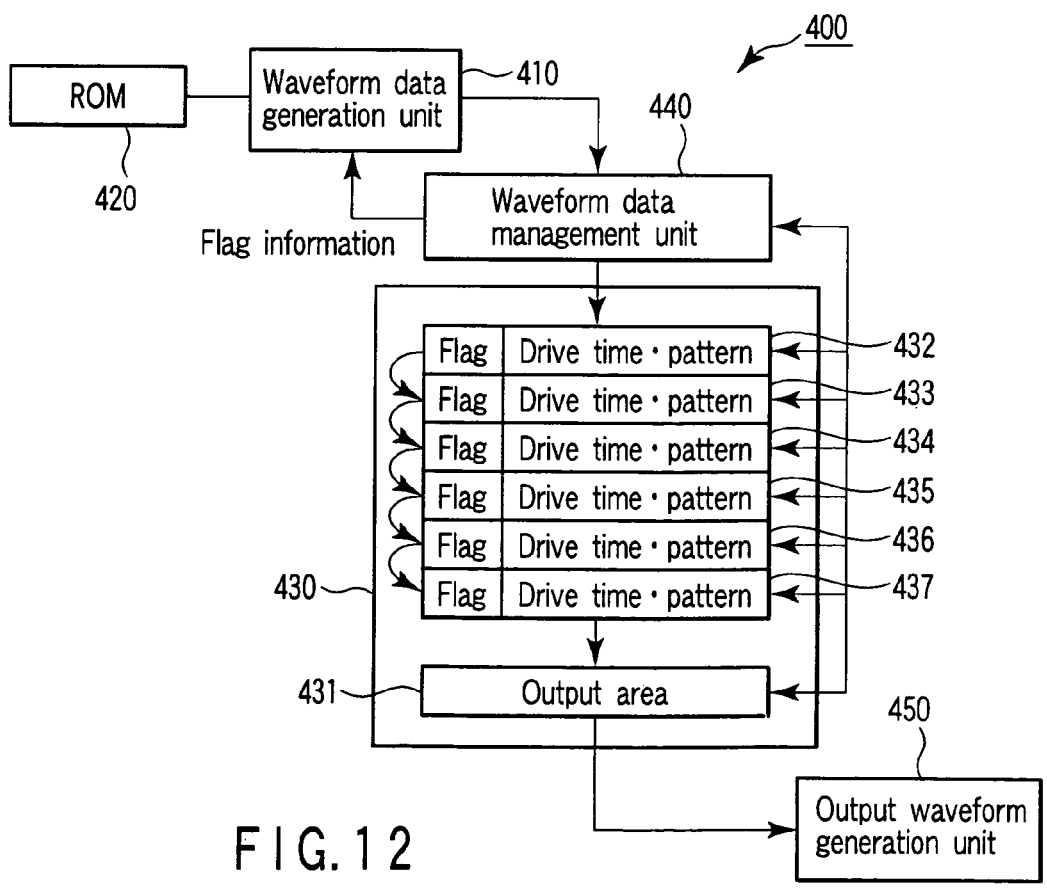
FIG. 12 is a block diagram showing an actuator control unit according to a fourth embodiment of the invention.

FIG. 12 is a block diagram showing an actuator control unit 400 according to a fourth embodiment of the invention. Similarly to the actuator control unit 70, the actuator control unit 400 is incorporated into the electrostatic actuator 10. In the actuator control unit 400, the technique referred to as buffer with flag is adopted.

The actuator control unit 400 includes a waveform data generation unit 410, a ROM 420 in which the control program is stored, a waveform output register 430, a waveform data management unit 440, and an output waveform generation unit 450. An output area 431 and buffer areas 432 to 437 are provided in the waveform output register 430.

The waveform data generation unit 410 calculates the current position and the drive direction of the actuator and generates the waveform data. At this point, information based on the later-mentioned flag is added. Then, the waveform data is sequentially inputted to the buffer areas 432 to 437 of the waveform output register 430. The waveform data includes flag data, drive pattern data, and drive time data.

When the waveform data exists in the output area 431, the waveform data management unit 440 outputs the waveform signal with predetermined drive pattern for the predetermined drive time on the basis of the waveform data. When the output area 431 is empty, the waveform data management unit 440 moves the waveform data in the buffer area 437 in the lowermost stage to the output area 431. At this point, the flag is transmitted to the waveform data generation unit 410.

The actuator control unit 400 having the above-described configuration transmits the waveform signal to the switching circuit 60 as described below. Namely, the waveform data generation unit 410 generates the waveform data in the same manner as the waveform data generation unit 71.

The waveform data management unit 440 writes the waveform data generated by the waveform data generation unit 410 in the buffer area 432. The waveform data in the buffer area 432 is sequentially transmitted to the buffer area 437 of the lower most stage. When the output area 431 is empty, the waveform data management unit 440 moves the waveform data in the buffer area 437 to the output area 431. At this point, the flag is transmitted to the waveform data generation unit 410. The waveform signal is outputted with the predetermined drive pattern for the predetermined drive time on the basis of the waveform data stored in the output area 431.

When the specified waveform output time has elapsed in the waveform data of the output area 431, the waveform data management unit 440 erases the waveform data and moves the waveform data stored in the buffer area 437 to the output area 431. Similarly, the waveform signal is outputted with the predetermined drive pattern for the predetermined drive time.

As described above, in the waveform data generation unit 410, the timing in which each piece of the waveform data is inputted to the output area 431 can be correctly grasped on the basis of the information from the flag. The waveform data generation unit 410 can correctly grasp the current output waveform by correctly recognizing the timing and generate the optimum waveform data. Namely, in the case of the electrostatic actuator 10 driven by the sequence of the waveform data, in order to realize the amount of movement required by the waveform data generation unit 410, time lag is generated in moving the data in the buffer area 432 to 437. Therefore, the virtual mount of drive managed by the waveform data generation unit 410 differs from the mechanical amount of drive. In the system in which the waveform data generation unit 410 changes the drive sequence using sensor information changed in accordance with the drive position of the electrostatic actuator 1, it is possible to prepare a parameter for correcting the virtual mount of drive and the mechanical amount of drive.

When the actuator is driven in one direction at constant speed, because the difference between the virtual mount of drive and the mechanical amount of drive is constant, it is possible to collate the sensor information in consideration of the difference. It is also possible that the difference is inputted as register information, or it is also possible that the difference in the amount of drive is determined using a calculating formula.

When there is no piece of information from the flag, the time interval from the input of the data to the buffer area 432 of the uppermost stage to the movement of the waveform data from the buffer area 437 of the lowermost stage to the output area 431 depends on the drive time included in the waveform data stored in each of the buffer areas 432 to 437, so that it is difficult to correctly grasp the time interval when the target waveform data is moved to the output area 431.

In accordance with the actuator control unit 400 of the fourth embodiment, similarly to the actuator control unit 70, even if the resolution of the waveform data is increased to perform the drive with high accuracy in controlling the electrostatic actuator 10, by providing the buffer areas 432 to 437 in the waveform output register 430, it is not necessary that the waveform data generation unit 410 is operated at high speed for the step of calculating the current position and the drive direction of the actuator, and the power consumption can be reduced. Further, the timing in which each piece of the waveform data is inputted to the output area 431 can be correctly grasped. Therefore, the waveform data generation unit 410 can correctly grasp the current output waveform and generate the optimum waveform data.

Figure 13:
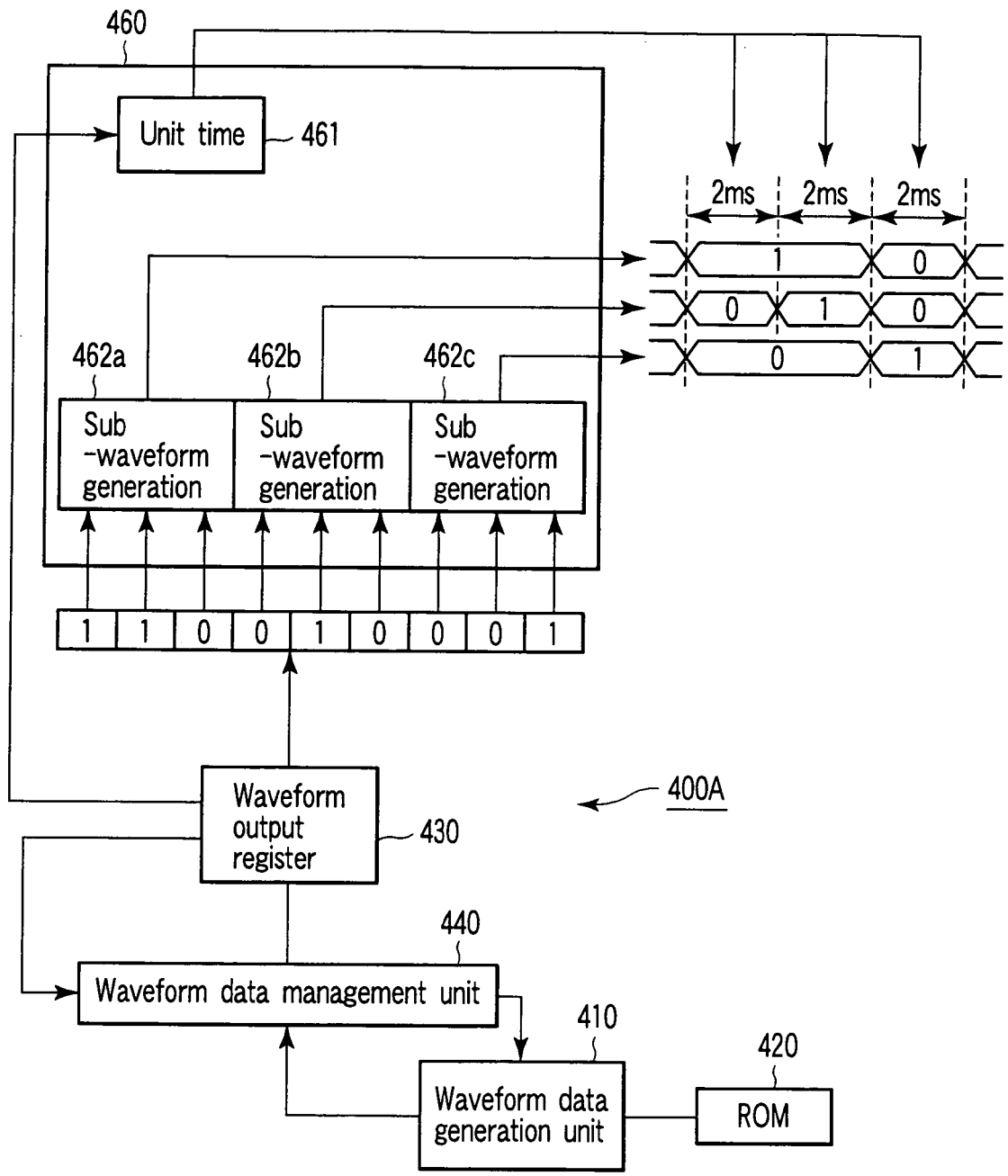
FIG. 13 is a block diagram showing an actuator control unit according to a fifth embodiment of the invention.

FIG. 13 is a block diagram showing an output waveform generation unit 460 incorporated in an actuator control unit 400A according to a fifth embodiment of the invention. In FIG. 13, the same functional portion as in FIG. 12 is represented by the same reference numeral, and the description of the same functional portion will be neglected.

The output waveform generation unit 460 includes a drive unit time storage register 461 in which the drive time is stored and sub-waveform generation units 462a to 462c.

The waveform output register 450 outputs the waveform signal with the predetermined drive pattern for the predetermined drive time, and the waveform signal is inputted to the output waveform generation unit 460.

In this case, the drive pattern is set to nine bits and the outputted waveform signal is set to three bits. Namely, the drive pattern having three bits can generate one output waveform. The drive pattern having nine bits is divided into each drive pattern having three bits, and the three drive patterns having three bits are inputted to the sub-waveform generation units 462a to 462c respectively. In the sub-waveform generation units 462a to 462c, when one output waveform is generated from the drive pattern having three bits, at first the highest-order bit is outputted in the drive pattern having three bits and inputted to the switching circuit 60. After the unit time has elapsed, the data of the bit subsequent to the highest-order bit is outputted for the unit time. Finally the lowest-order bit is outputted.

In accordance with the actuator control unit 400A of the fifth embodiment, similarly to the actuator control unit 400 of the fourth embodiment, the power consumption can be reduced even if the resolution of the waveform data is increased to perform the drive with high accuracy. Further, the optimum waveform data can be generated.

The waveform data generation unit 410 does not perform the time management but outputs the waveform data. The time management is performed by the output waveform generation unit 460. Therefore, the time management can be performed with no influence of the clock in the waveform data generation unit 410 and theoretically the time management can be performed in the resolution of the system clock, so that high-speed processing performance is not required for the waveform data generation unit 410 and the actuator control unit of the fifth embodiment can be used in the small-size portable equipment in which the low power consumption is demanded.

Figure 15:
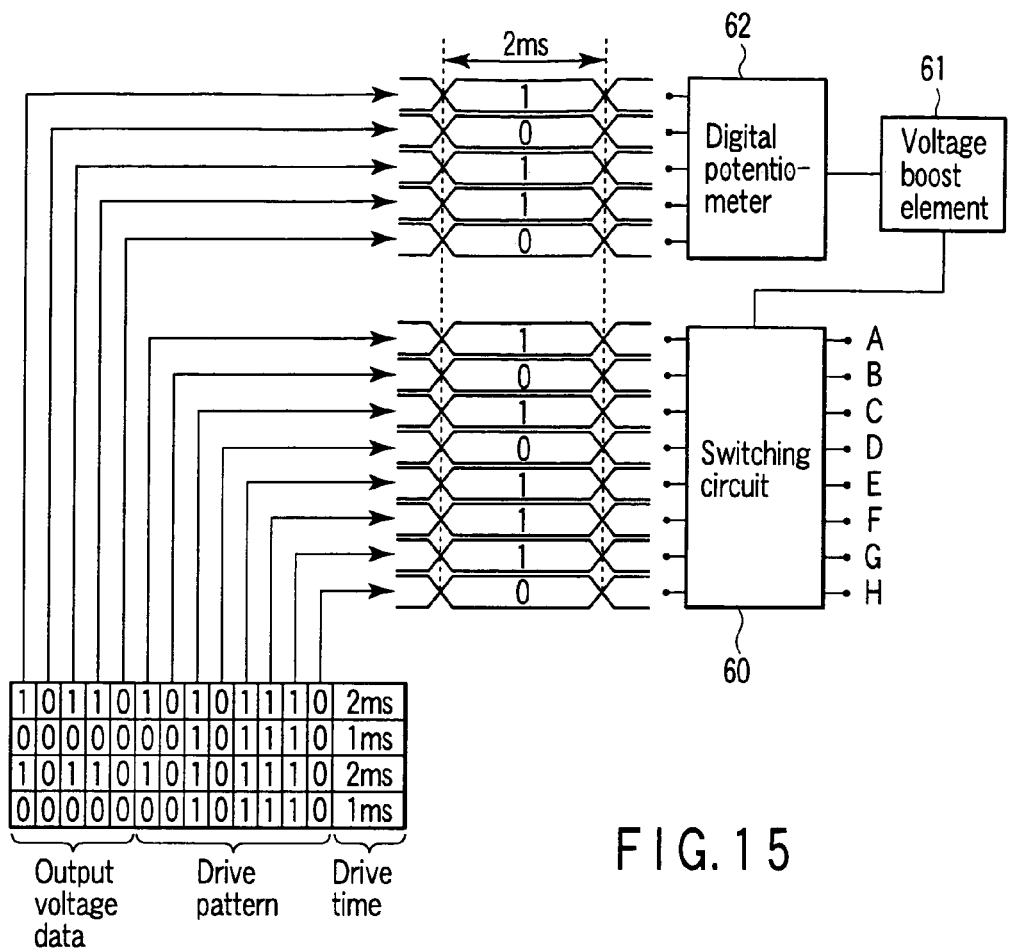
FIG. 15 is an explanatory view showing an operation principle of the actuator control unit according to the sixth embodiment of the invention.

FIG. 14 is a block diagram showing an actuator control unit 500 according to a sixth embodiment of the invention, and FIG. 15 is an explanatory view showing a principle of operation of the actuator control unit 500. Similarly to the actuator control unit 70, the actuator control unit 500 is incorporated into the electrostatic actuator 10.

The actuator control unit 500 includes a waveform data generation unit 510, a ROM 520 in which the control program is stored, a waveform output register 530, a waveform data management unit 540, and an output waveform generation unit 550. An output area 531 and buffer areas 532 to 537 are provided in the waveform output register 530.

In addition to the switching circuit 60, a digital potentiometer 62 having the function of converting the inputted voltage value into the resistance value is connected to the subsequent stage of the output waveform generation unit 550. A voltage boost element 61 which adjusts the output voltage on the basis of the inputted resistance value is connected to the subsequent stage of the digital potentiometer 62. A switching circuit 60 is connected to the output of the voltage boost element 61. DS1805 manufactured by Maxim Integrated Products can be cited as an example of the digital potentiometer 62. CR-0970 manufactured by TDK can be cited as an example of the voltage boost element 61.

The waveform data generation unit 510 calculates the current position and the drive direction of the actuator and generates the waveform data. At this point, information based on the later-mentioned flag is added. Then, the waveform data is sequentially inputted to the buffer areas 532 to 537 of the waveform output register 530. The waveform data includes the drive pattern data, the drive time data, and output voltage data.

When the waveform data exists in the output area 531, the waveform data management unit 540 outputs the waveform signal with predetermined drive pattern for the predetermined drive time on the basis of the waveform data. When the output area 531 is empty, the waveform data management unit 540 moves the waveform data in the buffer area 537 in the lowermost stage to the output area 531.

The waveform signal corresponding to the drive voltage is inputted to the potentiometer 62 and outputted as the resistance value. The outputted resistance value is inputted to the voltage boost element 61 and then inputted as the voltage to the switching circuit 60. Namely, the switching circuit 60 controls not only ON/OFF of the voltage but also the output voltage for the electrostatic actuator 10.

The actuator control unit 500 having the above-described configuration transmits the waveform signal to the switching circuit 60 as described below. Namely, the waveform data generation unit 510 generates the waveform data in the same manner as the waveform data generation unit 71.

The waveform data management unit 540 writes the waveform data generated by the waveform data generation unit 510 in the buffer area 532. The waveform data in the buffer area 532 is sequentially transmitted to the buffer area 537 of the lowermost stage. When the output area 531 is empty, the waveform data management unit 540 moves the waveform data in the buffer area 537 to the output area 531. On the basis of the waveform data stored in the output area 531, the waveform signal is outputted to the switching circuit 60 with the predetermined drive pattern for a predetermined drive time.

As shown in FIG. 15, after the output voltage data is converted into the waveform signal by the output waveform generation unit 550, the waveform signal is inputted to the digital potentiometer 62 and outputted as the resistance value. The outputted resistance value is inputted to the voltage boost element 61 and then inputted as the voltage to the switching circuit 60. Therefore, the switching circuit 60 drives the electrostatic actuator 10 with the predetermined waveform pattern and with the predetermined output voltage pattern.

When the specified waveform output time has elapsed in the waveform data of the output area 531, the waveform data management unit 540 erases the waveform data and moves the waveform data stored in the buffer area 537 to the output area 531. Similarly, the electrostatic actuator 10 is driven.

Therefore, the predetermined drive pattern can be outputted at an arbitrary output voltage in each drive time. Further, in the case of the operation mode in which the output voltage is not necessary as compared with the drive operation such as holding operation, the power consumption can be reduced in the holding operation by decreasing the voltage.

In accordance with the actuator control unit 500 of the fifth embodiment, similarly to the actuator control unit 70, even if the resolution of the waveform data is increased to perform the drive with high accuracy in controlling the electrostatic actuator 10, by providing the buffer areas 532 to 537 in the waveform output register 530, it is not necessary that the waveform data generation unit 510 is operated at high speed for the step of calculating the current position and the drive direction of the actuator, and the power consumption can be reduced. Further, the voltage for driving the electrostatic actuator 10 can be changed, and the power consumption can be reduced in the holding operation.

Figure 16:
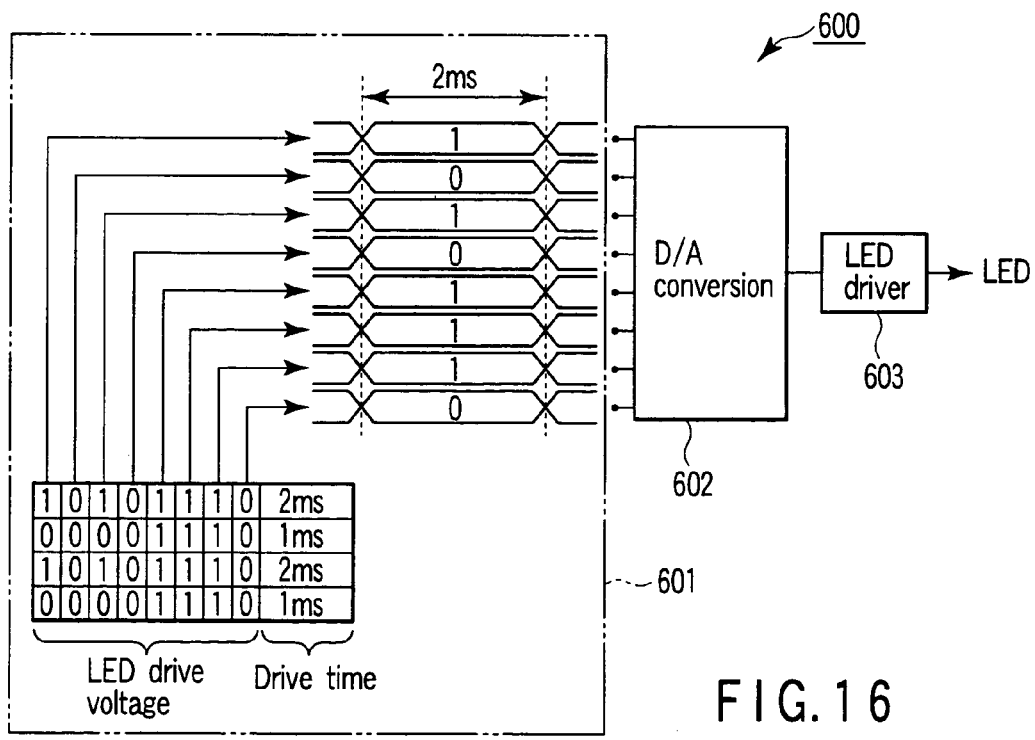
FIG. 16 is a block diagram showing a main part of an LED control device according to a seventh embodiment of the invention.

FIG. 16 is a block diagram showing a main part of an LED control device 600 according to a seventh embodiment of the invention. The LED control device 600 controls luminance of LED.

The LED control device 600 includes an LED control unit 601 which generates the waveform signal, a D/A converter 602 which performs D/A conversion of the waveform signal, and an LED driver 603 which generates constant current applied to LED by the input voltage.

Similarly to the actuator control units 70, 100, 200, 300, 400 and 500, the LED control unit 601 includes the buffer area in the preceding stage of output area of the waveform output register in order to reduce the load of the waveform data generation unit. The LED driver 603 can control the luminance of LED by adjustment of the output current value. LM2792 manufactured by National Semiconductor can be cited as an example of the LED driver 603.

The waveform data used in the LED control unit 601 includes drive voltage data and the drive time of LED.

In the LED control device 600 having the above-described configuration, after the waveform data is converted into the waveform signal, the D/A conversion of the waveform signal into the voltage is performed by the D/A converter 602. The voltage is converted into the current by the LED driver 603 and applied to LED. LED emits light with the luminance according to the applied current value.

In accordance with the LED control device 600 of the fifth embodiment, similarly to the actuator control unit 70 and the like, even if the resolution of the waveform data is increased to perform the drive with high accuracy in controlling the luminance of LED, by providing the buffer area in the waveform output register, it is not necessary that the waveform data generation unit 410 is operated at high speed in order to generate the waveform data, and the power consumption can be reduced.

Figure 17:
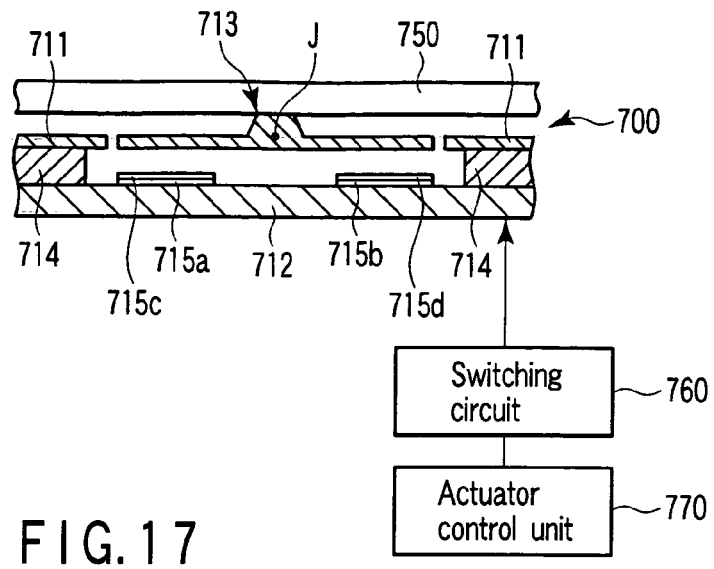
FIG. 17 shows a schematic configuration of an electrostatic plane actuator according to an eighth embodiment of the invention.
Figure 18A:
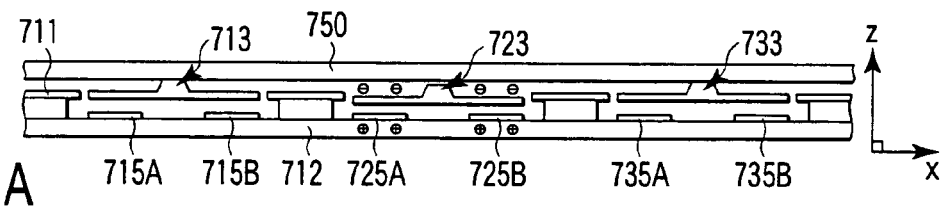
FIGS. 18A to 18D are explanatory views showing the operation principle of the electrostatic plane actuator according to the eighth embodiment of the invention.
Figure 18B:
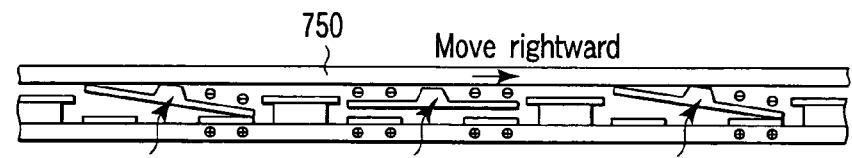
Figure 18C:
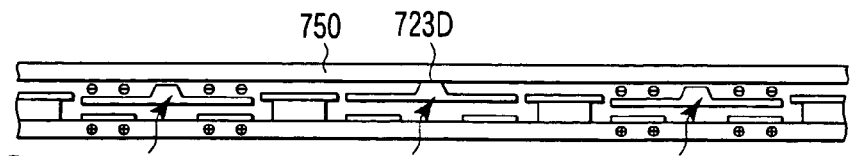
Figure 18D:
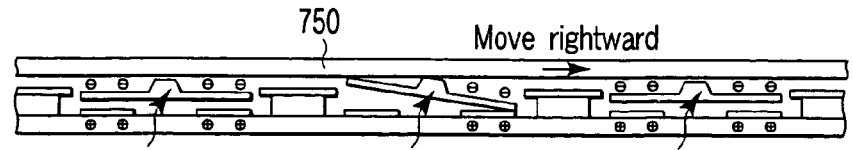
Figure 19:
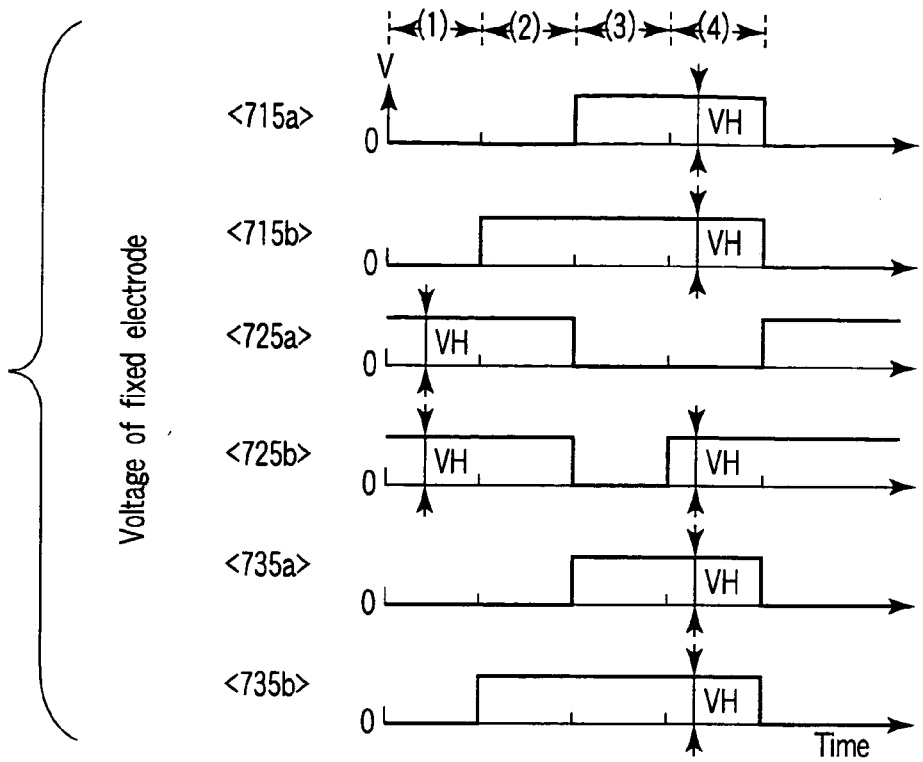
FIG. 19 is an explanatory view showing voltage application timing of the electrostatic plane actuator according to the eighth embodiment of the invention.

FIG. 17 shows a schematic configuration of an electrostatic plane actuator (electromechanical transducer) 700 according to an eighth embodiment of the invention, FIG. 18 is an explanatory view showing the operation principle of the electrostatic plane actuator 700, and FIG. 19 is an explanatory view showing voltage application timing of the electrostatic plane actuator 700.

The electrostatic plane actuator 700 includes a stator 710, a parallel moving plate 750 which becomes a moving body, a switching circuit 760 which applies the voltage to electrode substrates 715a, 715b, 725a, 725b, 735a and 735b, and an actuator control unit 770 which controls the switching circuit 760.

The stator 710 includes an upper surface plate 711 made of metal and a bottom surface plate 712 made of ceramic or the like. The upper surface plate 711 and the bottom surface plate 712 are a thin flat plate, and the upper surface plate 711 and the bottom surface plate 712 are located in parallel with each other while separated from each other with a predetermined interval. A plurality of support posts 714 for fixing the upper surface plate 711 and the bottom surface plate 712 is provided between the upper surface plate 711 and the bottom surface plate 712. A plurality of rocking elements 713, 723 and 733 are formed in the upper surface plate 711. In the rocking elements 713, 723 and 733, two electrodes are supported by a hinge. The rocking elements 713, 723 and 733 are rocked about a rocking axis in the direction perpendicular to the paper plane.

In the rocking elements 713, 723 and 733, when the specific voltage pattern is applied to the fixed electrode, electric potential difference is generated between the fixed electrode and the rocking element 713, 723 or 733. At this point, one of the electrodes of the rocking element 713, 723 or 733 is attracted to the fixed electrode, and the other electrode of the rocking element 713, 723 or 733 comes into contact with the parallel moving plate 750. This allows friction force to be generated to move the parallel moving plate 750. In FIG. 18, reference numerals 715a, 715b, 725a, 725b, 735a and 735b represent electrode substrates.

Since the switching circuit 760 is formed in the same way as the switching circuit 60 and the actuator control unit 770 is formed in the same way as the actuator control unit 70, the detail description will be neglected.

In the electrostatic plane actuator 700 having the above-described configuration, the drive is performed as below. When the actuator control unit 770 outputs the waveform pattern in which voltage Vh is a TTL level, the voltage is converted into Vh by the switching circuit 60 and inputted to the electrode substrates 715a, 715b, 725a, 725b, 735a and 735b.

As shown in FIG. 19, when the specific voltage pattern is sequentially applied, the rocking elements 713, 723 and 733 come into contact with the parallel moving plate 750, which generates the friction force to move the parallel moving plate 750.

In the actuator control unit 770, the waveform data management performed in parallel with the operation of the waveform data generation unit 71 is performed by the waveform data management unit 74, while the queues 1 to 3 acting as the buffer area are provided in the waveform output register 73. Therefore, the margin can be generated in the operation of the waveform data generation unit 71 which calculates the current position and the drive direction of the actuator.

In accordance with the electrostatic plane actuator 700 of the embodiment, similarly to the electrostatic actuator 10, even if the resolution of the waveform data is increased to perform the drive with high accuracy, it is not necessary that the waveform data generation unit 71 is operated at high speed for the step of calculating the current position and the drive direction of the actuator, and the power consumption can be reduced.

Figure 20:
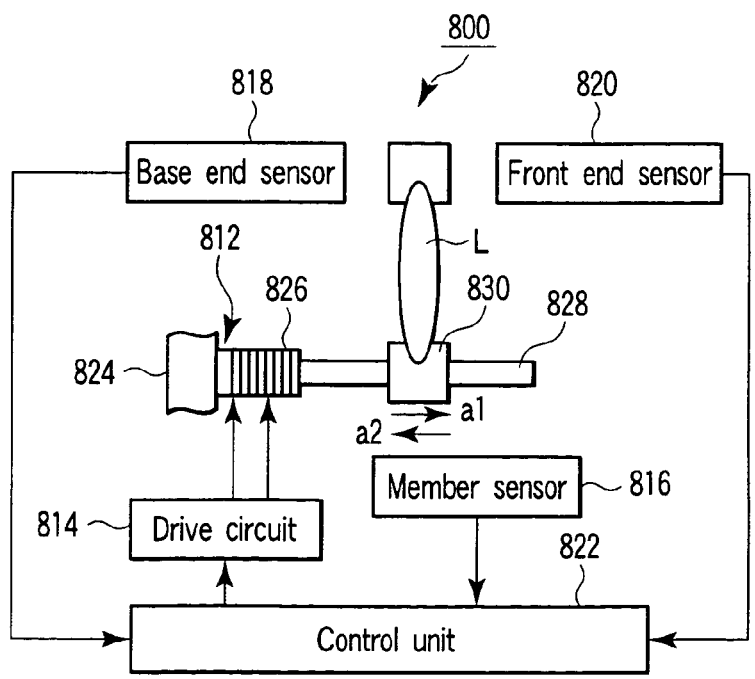
FIG. 20 shows a schematic configuration of a piezoelectric actuator according to a ninth embodiment of the invention.

FIG. 20 is a block diagram schematically showing the basic configuration of an impact type piezoelectric actuator 800 according to a ninth embodiment of the invention. The piezoelectric actuator 800 includes a drive unit 812, a drive circuit 814 which drives the drive unit 812, a member sensor 816 which detects a position of an engaging member 830 attached to the drive unit 812, a base end sensor 818 provided at a base end of the drive unit 812, a front end sensor 820 provided at a front end of the drive unit 812, and a control unit 822 which controls the overall operation.

The drive unit 812 has an element fixed type structure. The drive unit 812 includes a support member 824, an electromechanical transducer 826, a drive member 828, and the engaging member 830. The support member 824 supports the electromechanical transducer 826 and the drive member 828. The electromechanical transducer 826 is formed by laminating a plurality of piezoelectric substrates having a predetermined thickness while the electrode (not shown) is sandwiched between the piezoelectric substrates. A lens L which is of the driven subject is attached to the engaging member 830.

The control circuit 814 is formed in the same way as the switching circuit 60 and the control unit 822 is formed in the same way as the actuator control unit 70, so that the detail description will be neglected.

Figure 21:
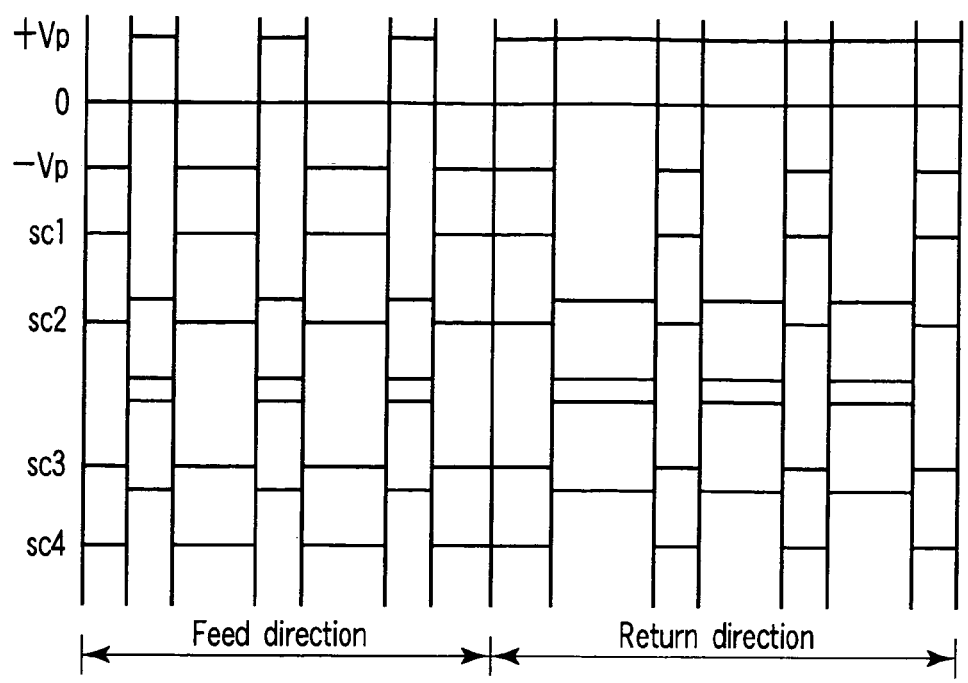
FIG. 21 is an explanatory view showing control signals which are outputted from a control unit controlling a drive circuit incorporated into the piezoelectric actuator and applied to each switching circuit.
Figure 22A:
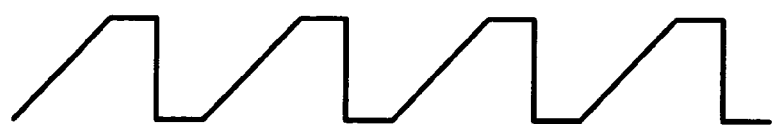
FIGS. 22A and 22B are explanatory views showing the waveform of drive voltage applied to an electromechanical transducer incorporated into the piezoelectric actuator.
Figure 22B:
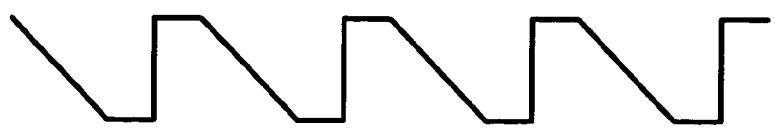

In the piezoelectric actuator 800 having the above-described configuration, when the waveform data shown in FIG. 21 is inputted from the control unit 822 to the drive circuit 814, the drive circuit 814 generates a voltage pattern necessary for the electromechanical transducer 826. The drive circuit 814 generates a sawtooth drive waveform shown in FIG. 22A or 22B to input the sawtooth drive waveform to the electromechanical transducer 826. When the drive voltage shown in FIG. 22A is applied to the electromechanical transducer 826, the engaging member 830 is intermittently moved toward the direction of an arrow a1 in FIG. 20. When the drive voltage shown in FIG. 22B is applied to the electromechanical transducer 826, the engaging member 803 is intermittently moved toward the direction of an arrow a2 in FIG. 20.

In the control unit 822, the waveform data management performed in parallel with the operation of the waveform data generation unit 71 is performed by the waveform data management unit 74, while the queues 1 to 3 acting as the buffer area are provided in the waveform output register 73. Therefore, the margin can be generated in the operation of the waveform data generation unit 71 which calculates the current position and the drive direction of the actuator.

In accordance with the electrostatic plane actuator 800 of the embodiment, similarly to the electrostatic actuator 10, even if the resolution of the waveform data is increased to perform the drive with high accuracy, it is not necessary that the waveform data generation unit is operated at high speed for the step of calculating the current position and the drive direction of the actuator, and the power consumption can be reduced.

While the electrostatic actuator, the electrostatic plane actuator, and the piezoelectric actuator were used as the electromechanical transducers in the embodiments, the invention is not limited to the above-described actuators as long as the element which generates mechanical drive force by applying the voltage is used as the electromechanical transducer. In addition to the element which generates the mechanical drive force, the invention can be applied to the control of LED and the control of various systems.

Figure 23:
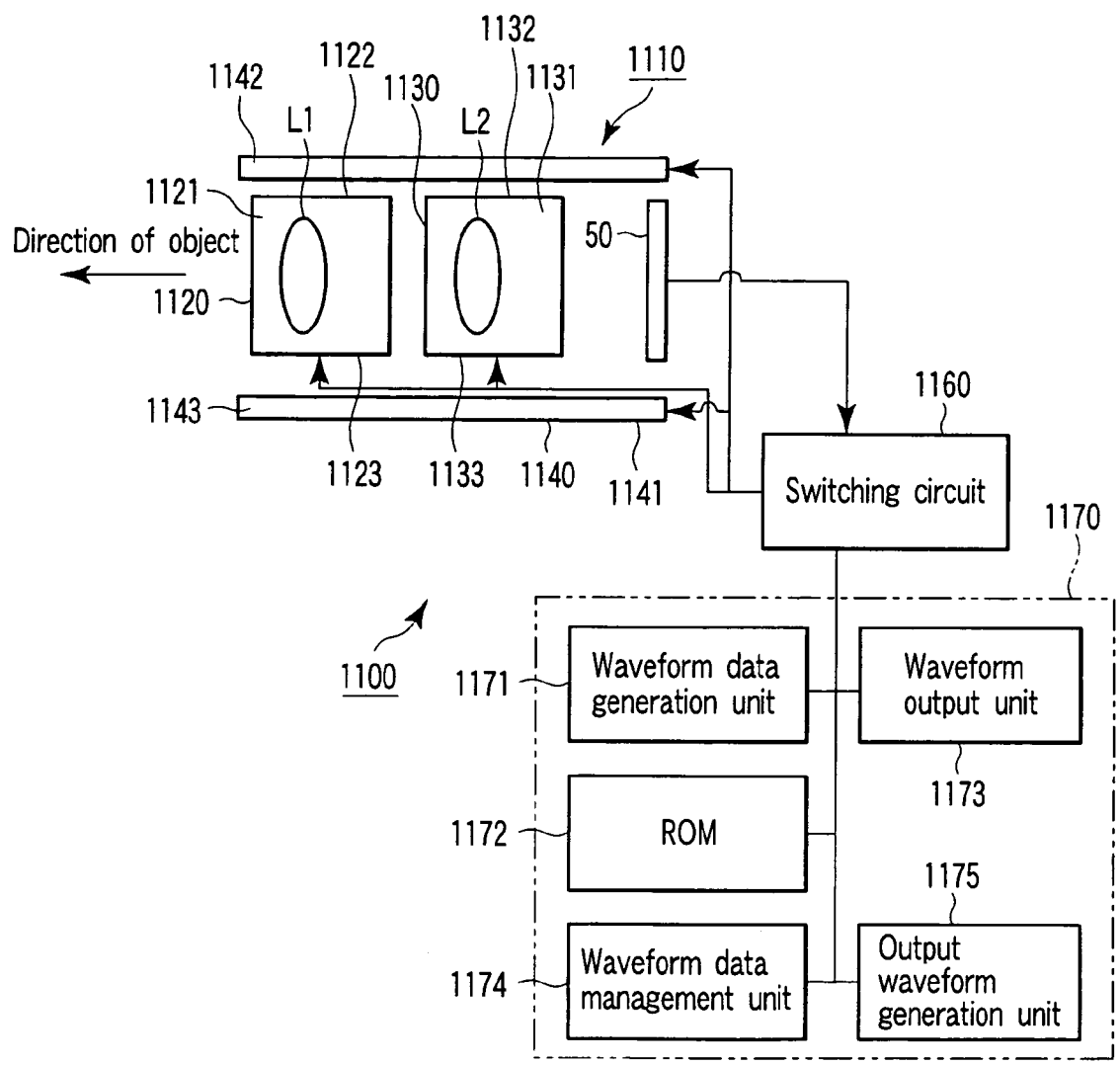
FIG. 23 shows a configuration of the electrostatic actuator into which a waveform output device according to a tenth embodiment of the invention is incorporated.
Figure 24:
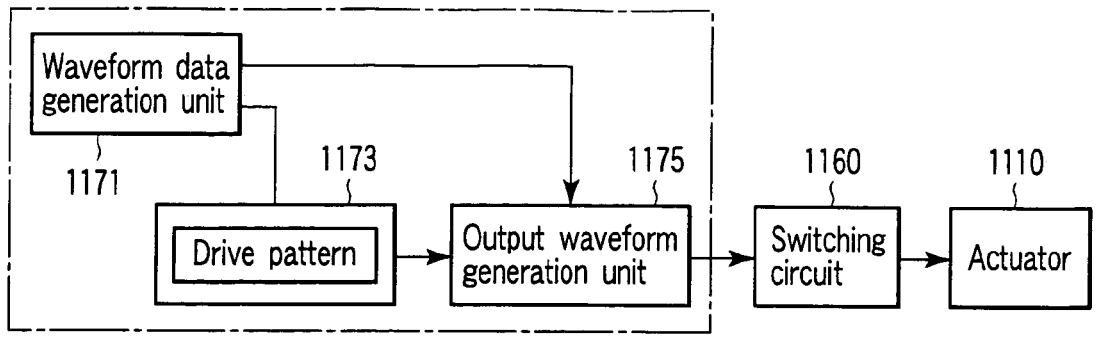
FIG. 24 is a block diagram showing a flow of signals in the waveform output device according to the tenth embodiment of the invention.
Figure 25:
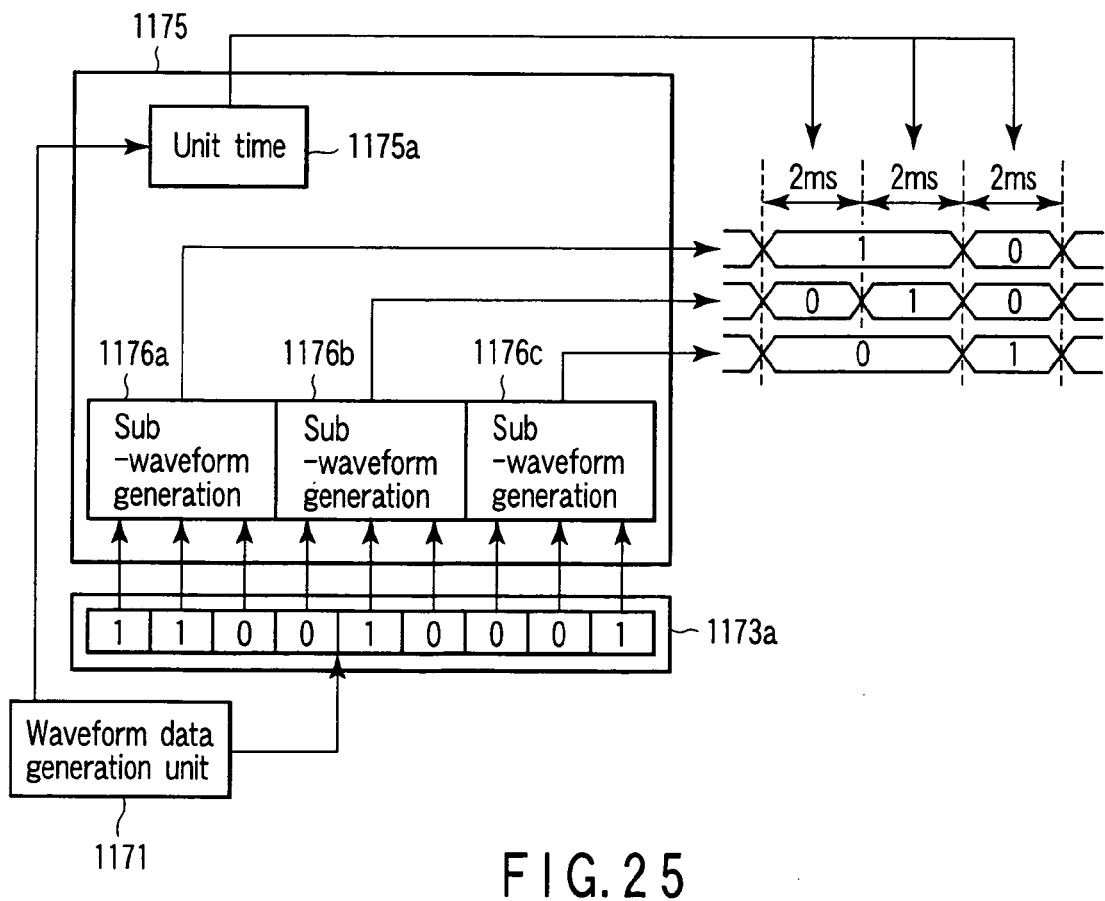
FIG. 25 is an explanatory view showing a principle of waveform generation by the waveform output device according to the tenth embodiment of the invention.

FIG. 23 shows a schematic configuration of an electrostatic actuator 1100 into which a waveform output device 1170 according to a tenth embodiment of the invention is incorporated, FIG. 24 is a block diagram showing the flow of the signal, and FIG. 25 is an explanatory view showing the principle of waveform generation.

The electrostatic actuator 1100 includes an actuator 1110, a switching circuit 1160 which drives the actuator 1110, and the waveform output device 1170 which controls the switching circuit 1160. The camera module incorporated into the miniature electronic device or the like is formed by the electrostatic actuator 1100.

The actuator 1110 includes a first movable element 1120 and second movable element 1130, a stator 1140, and an image pickup device 1150 imaged by the later-mentioned lenses L1 and L2.

The first movable element 1120 holds the lens L1 and includes a movable element main body 1121 formed in the shape of the substantially rectangular solid. A pair of electrode planes 1122 and 1123 are formed in the movable element main body 1121. The pair of electrode planes 1122 and 1123 are opposite to the later-mentioned electrode substrates 1142 and 1143 of the stator 1140, and a convex stripe electrode is formed in the pair of electrode planes 1122 and 1123 respectively.

The second movable element 1130 holds the lens L2 and includes a movable element main body 1131 formed in the shape of the substantially rectangular solid. A pair of electrode planes 1132 and 1133 are formed in the movable element main body 1131. The pair of electrode planes 1132 and 1133 are opposite to the later-mentioned electrode substrates 1142 and 1143 of the stator 1140, and a convex stripe electrode is formed in the pair of electrode planes 1132 and 1133 respectively.

A stator frame 1141 and the electrode substrates 1142 and 1143 are formed in the stator 1140. The electrode substrates 1142 and 1143 are attached to the surfaces opposite to the electrode planes 1122, 1123, 1132 and 1133. In the electrode substrate 1142 and 1143, stripe-shaped electrodes are formed in the electrode planes opposite to the first movable element 1120 and the second movable element 1130.

The switching circuit 1160 has the function of converting the inputted waveform signal into the voltage to provide the voltage to the first movable element 1120, the second movable element 1130, and the electrode substrate 1142 and 1143. Namely, 1/0 of each bit of the drive pattern corresponds to High/Low of the voltage provided to the electrodes.

The waveform output device 1170 includes a waveform data generation unit 1171 including an MPU, a ROM 1172 in which the control program is stored, a waveform output register 1173, a waveform data management unit 1174, and an output waveform generation unit 1175.

The waveform output register 1173 has a data storage area 1173a in which the drive pattern is stored. The output waveform generation unit 1175 has a drive unit time storage register 1175a in which the drive unit time is stored and sub-waveform generation units 1176a to 1176c.

In the electrostatic actuator 1100 having the above-described configuration, as shown in FIG. 25, the waveform signal is outputted to perform the control of the actuator. The unit time data is previously transmitted from the waveform data generation unit 1171 to the output waveform generation unit 1175, and the unit time data is stored in the drive unit time storage register 1175a of the output waveform generation unit 1175.

The waveform data generation unit 1171 generates the drive pattern on the basis of the signal input from the outside or the preset program. In this case, the drive pattern is set to nine bits and the outputted waveform signal is set to three bits. Namely, the drive pattern having three bits can generate one output waveform.

The drive pattern is stored in the data storage area 1173*a*. The drive pattern having nine bits is divided into each drive pattern having three bits, and the three drive patterns having three bits are inputted to the sub-waveform generation units 1176*a* to 1176*c* respectively. In the sub-waveform generation units 1176*a* to 1176*c*, when one output waveform is generated from the drive pattern having three bits, at first the highest-order bit is outputted in the drive pattern having three bits and inputted to the switching circuit 1160. After the unit time has elapsed, the data of the bit subsequent to the highest-order bit is outputted for the unit time. Finally the lowest-order bit is outputted.

The waveform can be generated by adopting the above-described method, even if the information on the drive time does not exist in the waveform data. This configuration is effective for the case in which it is not necessary to finely control the drive time by synchronizing to the drive pattern. For example, the configuration is effective when the holding operation of the movable elements 1120 and 1130 is outputted.

It is also possible to prepare the plurality of drive unit time storage registers 1175*a* to automatically repeatedly use the unit time. For example, the drive of the electrostatic actuator can be realized by repeating the two unit times.

The waveform signal inputted to the switching circuit 1160 is converted into the voltage and provided to the electrode substrates 1142, 1143, 1122, 1123, 1132 and 1133. The first movable element 1120 and the second movable element 1130 are repeatedly attracted and held by four electrostatic forces. The first movable element 1120 and the second movable element 1130 are thus driven toward the object direction or the opposite direction to the object direction to perform the zooming or focusing. The first electrostatic force is generated between the electrode substrates 1142 and 1122 of the first movable element 1120. The second electrostatic force is generated between the electrode substrates 1143 and 1123 of the first movable element 1120. The third electrostatic force is generated between the electrode substrates 1142 and 1132 of the second movable element 1130. The fourth electrostatic force is generated between the electrode substrates 1143 and 1133 of the second movable element 1130.

As described above, in the waveform output device 1170, the waveform data generation unit 1171 does not perform the time management but outputs the waveform data. The time management is performed by the output waveform generation unit 1175. Therefore, the time management can be performed with no influence of the clock in the waveform data generation unit 1171 and theoretically the time management can be performed in the resolution of the system clock, so that high-speed processing performance is not required for the waveform data generation unit 1171 and the waveform output device of the tenth embodiment can be used in the small-size portable equipment in which the low power consumption is demanded.

Figure 26:
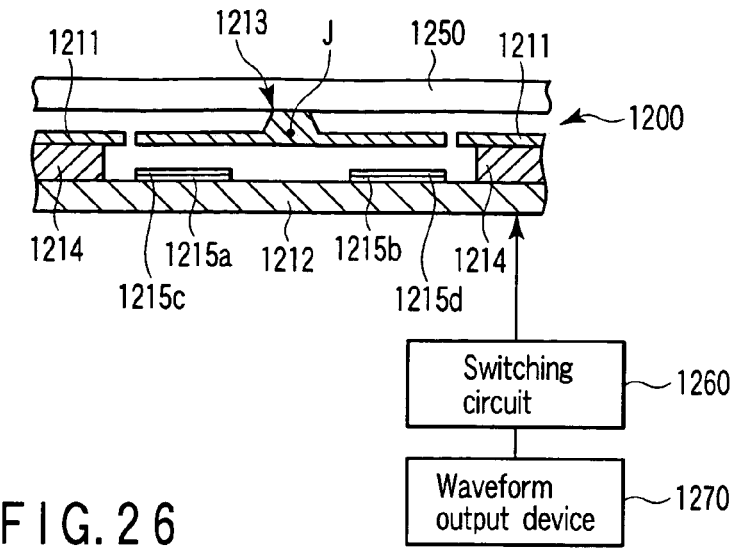
FIG. 26 shows a configuration of the electrostatic plane actuator into which a waveform output device according to an eleventh embodiment of the invention is incorporated.
Figure 27A:
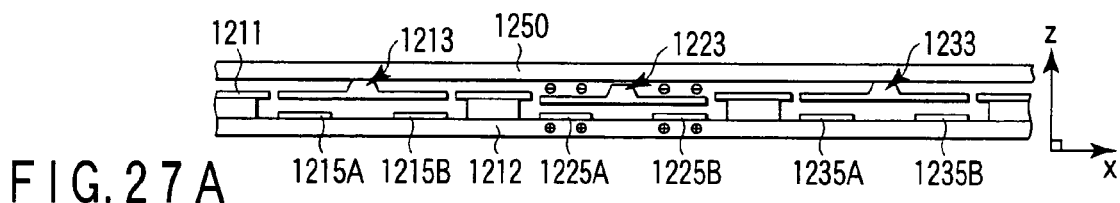
FIGS. 27A to 27D are each an explanatory view showing the operation principle of the electrostatic plane actuator.
Figure 27B:
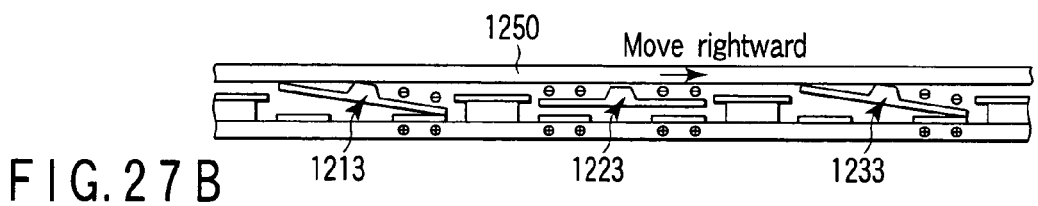
Figure 27C:
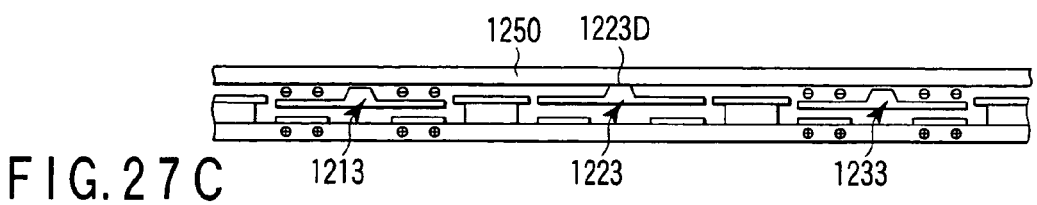
Figure 27D:
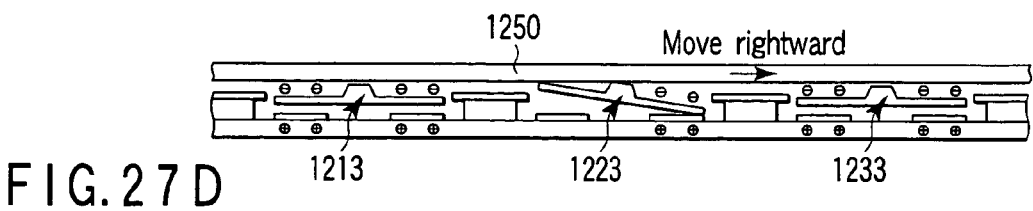
Figure 28:
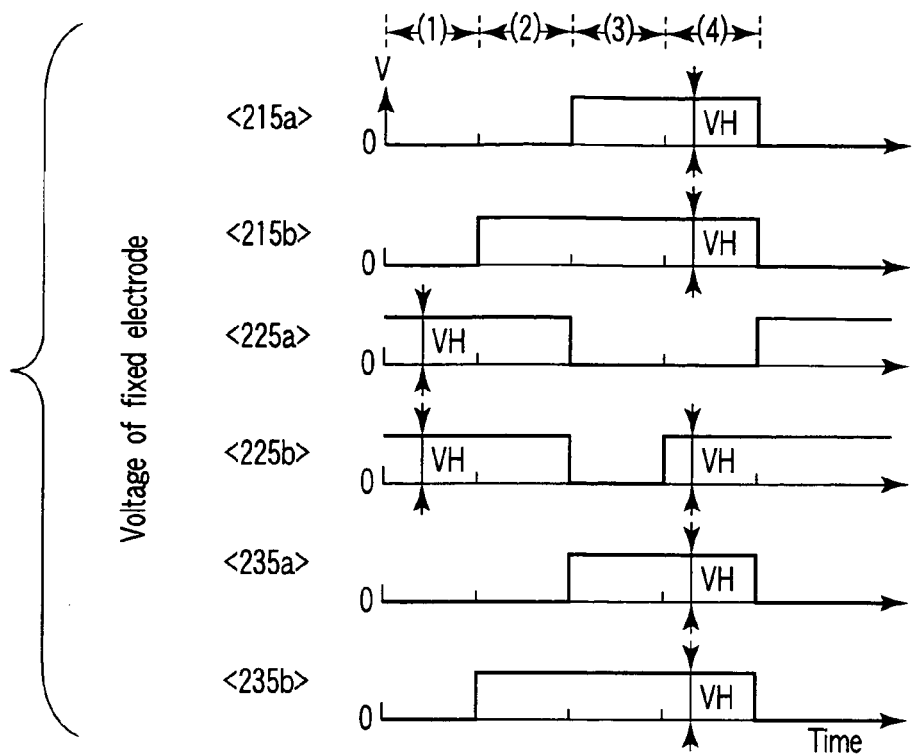
FIG. 28 is an explanatory view showing the voltage application timing of the electrostatic plane actuator.

FIG. 26 shows a schematic configuration of an electrostatic plane actuator (electromechanical transducer) 1200 according to an eleventh embodiment of the invention, FIGS. 27A to 27D are an explanatory view showing the operation principle of the electrostatic plane actuator 1200, and FIG. 28 is an explanatory view showing voltage application timing of the electrostatic plane actuator 1200.

The electrostatic plane actuator 1200 includes a stator 1210, a parallel moving plate 1250 which becomes a moving body, a switching circuit 1260 which applies the voltage to electrode substrates 1215*a*, 1215*b*, 1225*a*, 1225*b*, 1235*a* and 1235*b*, and a waveform output device 1270 which controls the switching circuit 1260 by application of a pulse signal.

The stator 1210 includes an upper surface plate 1211 made of metal and a bottom surface plate 1212 made of ceramic or the like. The upper surface plate 1211 and the bottom surface plate 1212 are a thin flat plate, and the upper surface plate 1211 and the bottom surface plate 1212 are located in parallel with each other while separated from each other with a predetermined interval. A plurality of support posts 1214 for fixing the upper surface plate 1211 and the bottom surface plate 1212 are provided between the upper surface plate 1211 and the bottom surface plate 1212. A plurality of rocking elements 1213, 1223 and 1233 are formed in the upper surface plate 1211. In the rocking elements 1213, 1223 and 1233, two electrodes are supported by the hinge. The rocking elements 1213, 1223 and 1233 are rocked about the rocking axis in the direction perpendicular to the paper plane.

In the rocking elements 1213, 1223 and 1233, when the specific voltage pattern is applied to the fixed electrode, the electric potential difference is generated between the fixed electrode and the rocking element 1213, 1223 or 1233. At this point, one of the electrodes of the rocking element 1213, 1223 or 1233 is attracted to the fixed electrode, and the other electrode of the rocking element 1213, 1223 or 1233 comes into contact with the parallel moving plate 1250. This allows the friction force to be generated to move the parallel moving plate 1250. In FIG. 26, reference numerals 1215*a*, 1215*b*, 1225*a*, 1225*b*, 1235*a* and 1235*b* represent electrode substrates.

Since the switching circuit 1260 is formed in the same way as the switching circuit 1160 and the waveform output device 1270 is formed in the same way as the waveform output device 1170, the detail description will be neglected.

In the electrostatic plane actuator 1200 having the above-described configuration, the drive is performed as below. When the waveform output device 1270 outputs the waveform pattern in which voltage Vh is a TTL level, the voltage is converted into Vh by the switching circuit 60 and inputted to the electrode substrates 1215*a*, 1215*b*, 1225*a*, 1225*b*, 1235*a* and 1235*b*.

As shown in FIG. 28, when the specific voltage pattern is sequentially applied, the rocking elements 1213, 1223 and 1233 come into contact with the parallel moving plate 1250, which generates the friction force to move the parallel moving plate 1250.

As described above, in the waveform output device 1270, the waveform data generation unit 1171 does not perform the time management but outputs the waveform data, and the time management is performed by the output waveform generation unit 1175, so that the time management can be performed with no influence of the clock in the waveform data generation unit 1171 and theoretically the time management can be performed in the resolution of the system clock. Therefore, similarly to the electrostatic actuator 1100, the high-speed processing performance is not required for the waveform data generation unit 1171 for the step of calculating the current position and the drive direction of the actuator even if resolution of the waveform data is increased to perform the drive with high accuracy, and the electrostatic plane actuator 1200 can be used in the small-size portable equipment in which the low power consumption is demanded.

Figure 29:
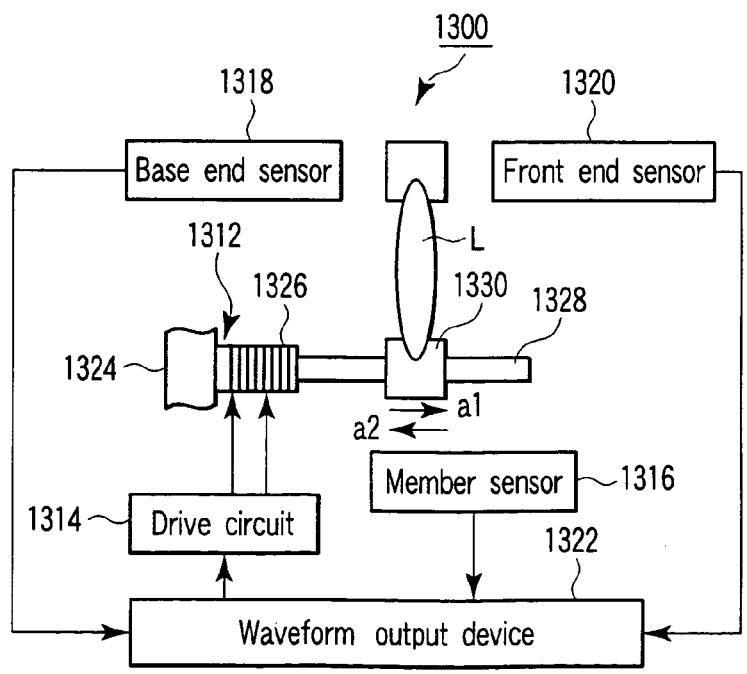
FIG. 29 shows a configuration of the piezoelectric actuator into which a waveform output device according to a twelfth embodiment of the invention is incorporated.

FIG. 29 is a block diagram schematically showing the basic configuration of an impact type piezoelectric actuator 1300 according to a twelfth embodiment of the invention. The piezoelectric actuator 1300 includes a drive unit 1312, a drive circuit 1314 which drives the drive unit 1312, a member sensor 1316 which detects a position of an engaging member 1330 attached to the drive unit 1312, a base end sensor 1318 provided at the base end of the drive unit 1312, a front end sensor 1320 provided at the front end of the drive unit 1312, and a control unit (waveform output device) 1322 which controls the overall operation.

The drive unit 1312 has the element fixed type structure. The drive unit 1312 includes a support member 1324, an electromechanical transducer 1326, a drive member 1328, and the engaging member 1330. The support member 1324 supports the electromechanical transducer 1326 and the drive member 1328. The electromechanical transducer 1326 is formed by laminating the plurality of piezoelectric substrates having a predetermined thickness while the electrode (not shown) is sandwiched between the piezoelectric substrates. A lens L which is of the driven subject is attached to the engaging member 1330.

The control circuit 1314 is formed in the same way as the switching circuit 1160 and the control unit 1322 is formed in the same way as the waveform output device 1170, so that the detail description will be neglected.

Figure 30:
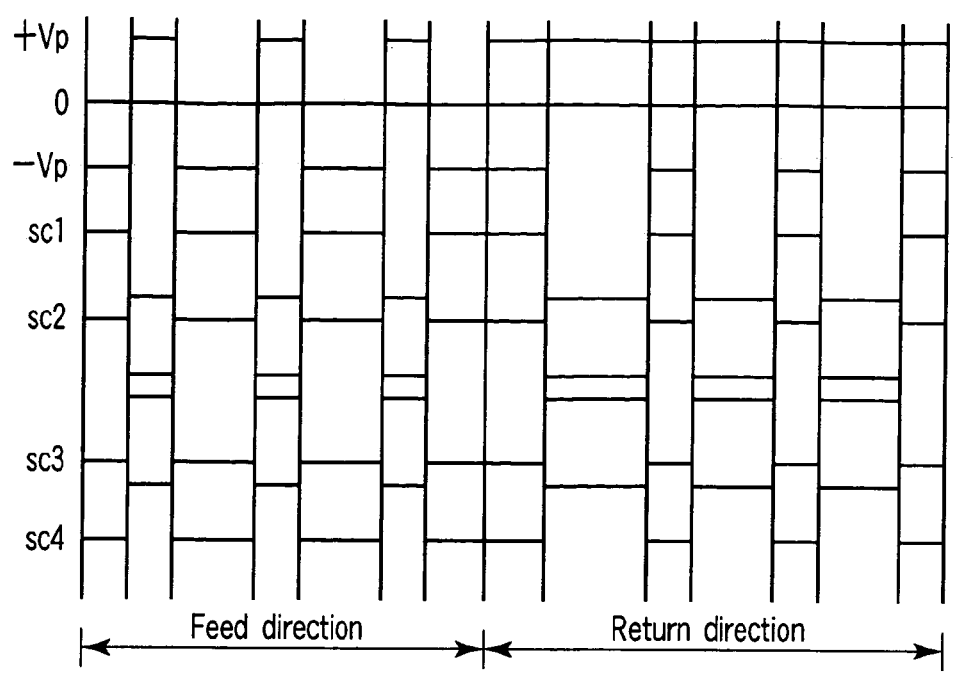
FIG. 30 is an explanatory view showing the control signals which are outputted from the control unit controlling the drive circuit incorporated into the piezoelectric actuator and applied to each switching circuit.
Figure 31A:
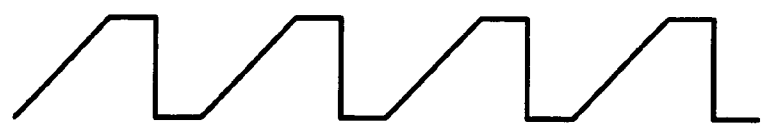
FIGS. 31A and 31B are each an explanatory view showing the waveform of the drive voltage applied to the electromechanical transducer incorporated into the piezoelectric actuator.
Figure 31B:
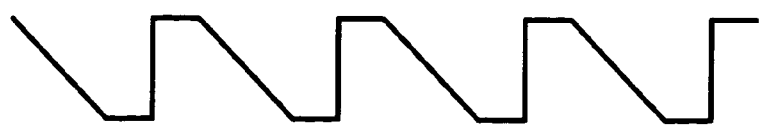

In the piezoelectric actuator 1300 having the above-described configuration, when the drive pattern shown in FIG. 30 is inputted from the control unit 1322 to the drive circuit 1314, the drive circuit 1314 generates the voltage pattern necessary for the electromechanical transducer 1326. The drive circuit 1314 generates the sawtooth drive waveform shown in FIG. 31A or 31B to input the sawtooth drive waveform to the electromechanical transducer 1326. When the drive voltage shown in FIG. 31A is applied to the electromechanical transducer 1326, the engaging member 1303 is intermittently moved toward the direction of an arrow a1 in FIG. 29. When the drive voltage shown in FIG. 31B is applied to the electromechanical transducer 1326, the engaging member 1303 is intermittently moved toward the direction of an arrow a2 in FIG. 29.

As described above, in the control unit 1322, the waveform data generation unit 1171 does not perform the time management but outputs the waveform data, and the time management is performed by the output waveform generation unit 1175, so that the time management can be performed with no influence of the clock in the waveform data generation unit 1171 and theoretically the time management can be performed in the resolution of the system clock. Therefore, similarly to the electrostatic actuator 1100, the high-speed processing performance is not required for the waveform data generation unit 1171 for the step of calculating the current position and the drive direction of the actuator even if resolution of the waveform data is increased to perform the drive with high accuracy, and the piezoelectric actuator 1300 can be used in the small-size portable equipment in which the low power consumption is demanded.

Figure 32:
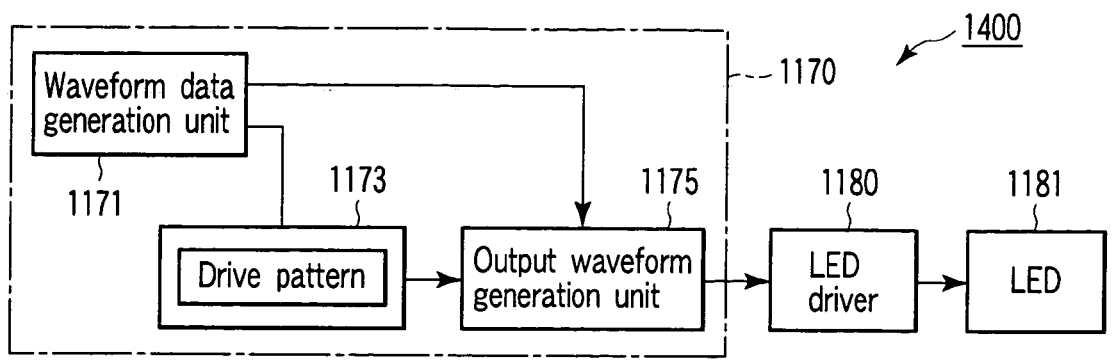
FIG. 32 shows a configuration of an LED device into which a waveform output device according to a thirteenth embodiment of the invention is incorporated.
Figure 33:
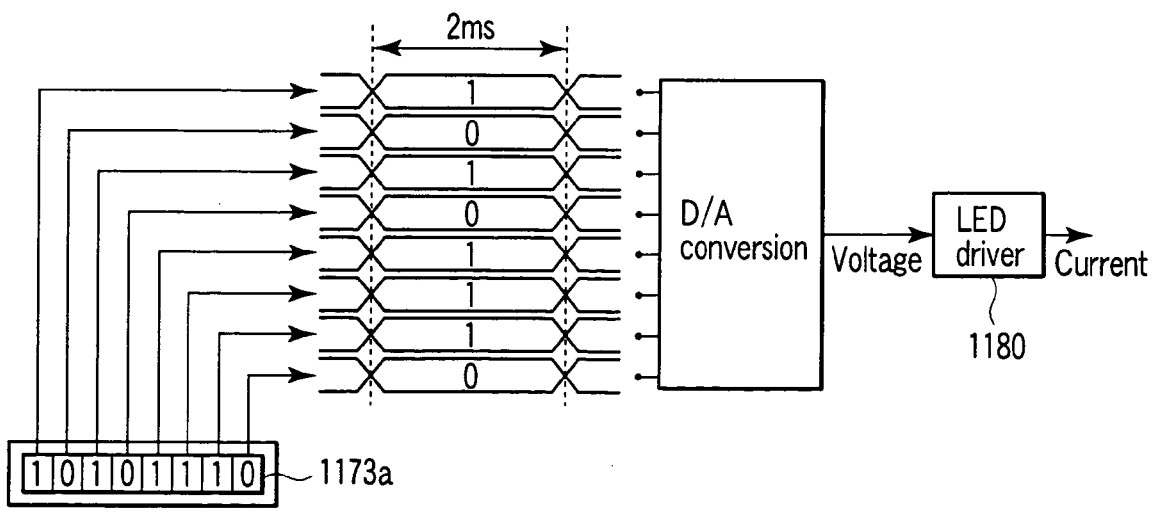
FIG. 33 is an explanatory view showing the principle of waveform generation by the waveform output device according to the thirteenth embodiment of the invention.

FIG. 32 is a block diagram showing the flow of the signal in an LED device (electric element) 1400 which can control the luminance according to a thirteenth embodiment of the invention, and FIG. 33 is an explanatory view showing the principle of waveform generation. In FIGS. 32 and 33, the same functional portion as in FIGS. 23 to 25 is represented by the same reference numeral, and the detail description will be neglected.

The LED device 1400 includes the waveform output device 1170, an LED driver 1180 which generates the constant current by the input voltage, and LED 1181 which changes the luminance according to the current value from the LED driver 1180. LM2792 manufactured by National Semiconductor can be cited as an example of the LED driver 1180.

As shown in FIG. 33, in the LED device 1400 having the above-described configuration, the waveform signal is outputted to control the luminance of LED 1181. The unit time data is previously transmitted from the waveform data generation unit 1171 to the output waveform generation unit 1175, and the unit time data is stored in the drive unit time storage register 1175a of the output waveform generation unit 1175.

The waveform data generation unit 1171 generates the drive pattern corresponding to the drive voltage of LED 1181 on the basis of the signal input from the outside or the preset program. The drive pattern is stored in the data storage area 1173a. The output waveform generation unit 1175 performs the D/A conversion on the basis of the drive pattern stored in the data storage area 1173a and outputs the waveform signal for the unit time stored in the drive unit time storage register 1175a.

The waveform signal is inputted as the voltage value to the LED driver 1180. The waveform signal inputted to the LED driver 1180 is converted into the current and supplied to LED 1181. For example, when the input voltage and the output current of the LED driver have the linear relationship, the output current is increased by increasing the input voltage, which results in the increase in luminance of LED 1181. LED 1181 emits the light at the luminance according to the provided current value.

As described above, in the waveform output device 1170, the waveform data generation unit 1171 does not perform the time management but outputs the waveform data, and the time management is performed by the output waveform generation unit 1175, so that the time management can be performed with no influence of the clock in the waveform data generation unit 1171 and theoretically the time management can be performed in the resolution of the system clock. Therefore, the high-speed processing performance is not required for the waveform data generation unit 1171, and the LED device 1400 can be used in the small-size portable equipment in which the low power consumption is demanded. For example, the LED device 1400 can be applied, for example, to a backlight control circuit of a cellular phone in which the control of the luminance of LED 1181 is required.

Figure 34:
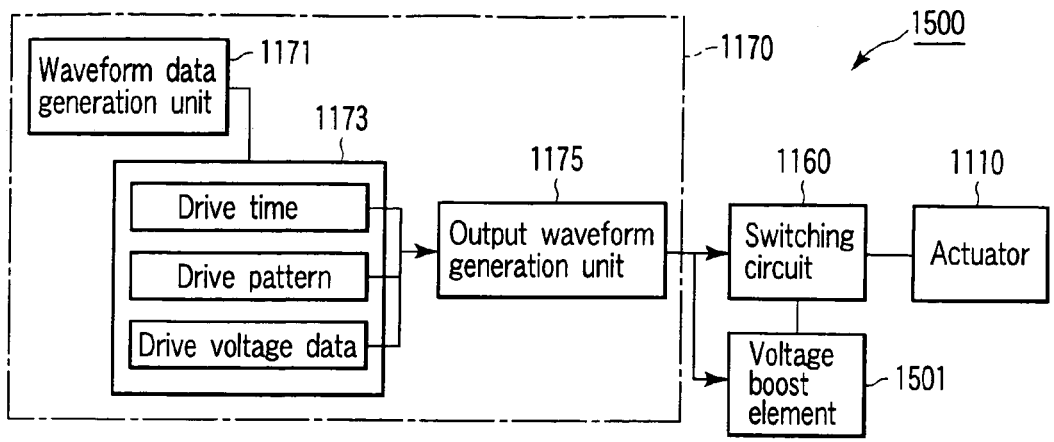
FIG. 34 shows a configuration of the electromechanical transducer into which a waveform output device according to a fourteenth embodiment of the invention is incorporated.
Figure 35:
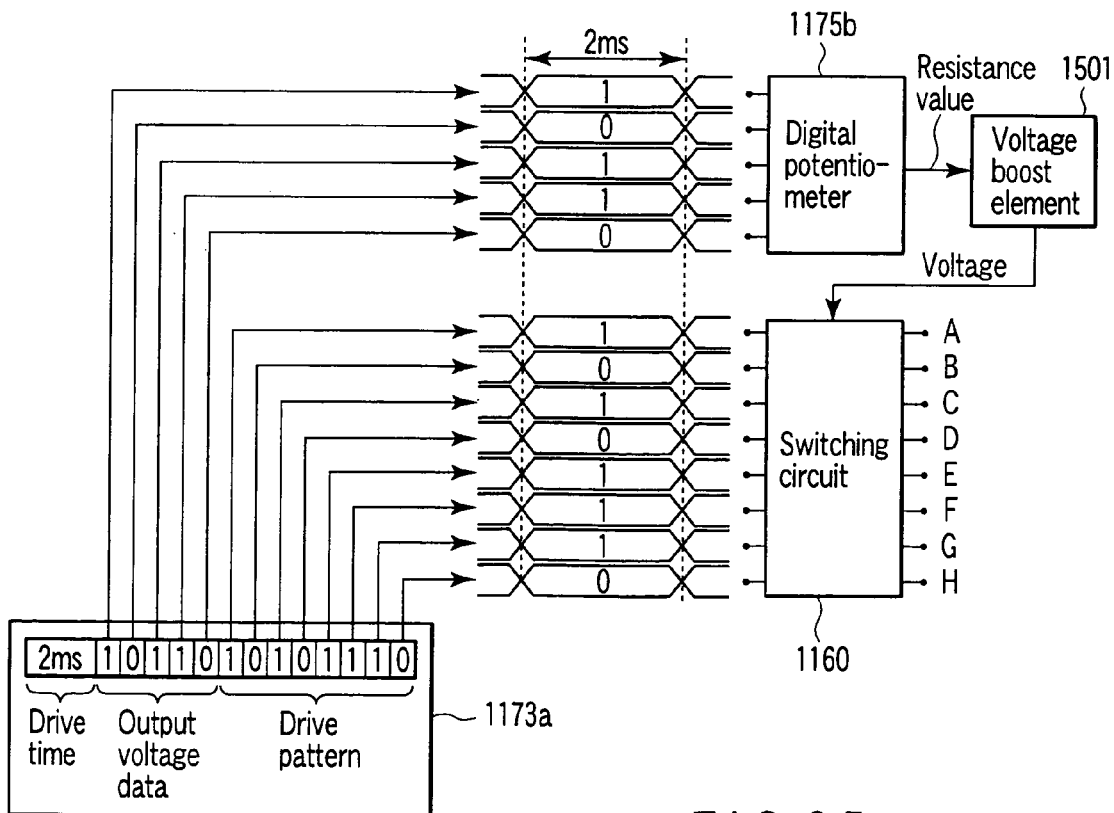
FIG. 35 is an explanatory view showing the principle of waveform generation by the waveform output device according to the fourteenth embodiment of the invention.

FIG. 34 is a block diagram showing the flow of the signal in an electrostatic actuator 1500 according to a fourteenth embodiment of the invention, and FIG. 35 is an explanatory view showing the principle of waveform generation. In FIGS. 34 and 35, the same functional portion as in FIGS. 23 to 25 is represented by the same reference numeral, and the detail description will be neglected.

The electrostatic actuator 1500 includes a voltage boost element 1501 which applies the voltage corresponding to the inputted resistance value to the switching circuit 1160. The waveform data generation unit 1171 generates the drive time, the drive pattern, and the drive voltage data to input the drive time, the drive pattern, and the drive voltage data to the output waveform generation unit 1175 through the waveform output register 1173. In FIG. 35, the reference numeral 1175b represents the digital potentiometer, and the digital potentiometer 1175b has the function of outputting the resistance value according to the inputted waveform signal.

In the electrostatic actuator 1500 having the above-described configuration, the waveform data generation unit 1171 generates the drive time, drive pattern, and drive voltage data of the actuator 1110 on the basis of the signal input from the outside or the preset program. The drive time, the drive pattern, and the drive voltage data are stored in the data storage area 1173a. As shown in FIG. 35, the output waveform generation unit 1175 performs the D/A conversion on the basis of the drive time, drive pattern, and drive voltage data stored in the data storage area 1173a and outputs the waveform signal for the unit time corresponding to the drive time data.

The waveform signal is inputted to the digital potentiometer 1175b and inputted as the resistance value to the voltage boost element 1501. The voltage boost element 1501 applies the voltage corresponding to the inputted resistance value to the switching circuit 1160. The switching circuit 1160 outputs the boosted voltage when each port of the drive pattern is in the High state, and switching circuit 1160 outputs 0 V to the actuator 1110 in other cases. The actuator 1110 performs the mechanical movement by the sequence of the waveform signal.

As described above, in the waveform output device 1170, the waveform data generation unit 1171 does not perform the time management but outputs the waveform data, and the time management is performed by the output waveform generation unit 1175, so that the time management can be performed with no influence of the clock in the waveform data generation unit 1171 and theoretically the time management can be performed in the resolution of the system clock. Therefore, similarly to the electrostatic actuator 1100, the high-speed processing performance is not required for the waveform data generation unit 1171 for the step of calculating the current position and the drive direction of the actuator even if resolution of the waveform data is increased to perform the drive with high accuracy, and the electrostatic actuator 1500 can be used in the small-size portable equipment in which the low power consumption is demanded.

In the electrostatic actuator 1500, since generally the drive voltage is constant, the output voltage of the voltage boost element 1501 may be fixed and the drive voltage data may not be managed by the output waveform generation unit 1175. However, when the waveform voltage is managed, the drive voltage can be decreased in the standby state, which results in the effect that the power consumption is reduced.

Figure 36:
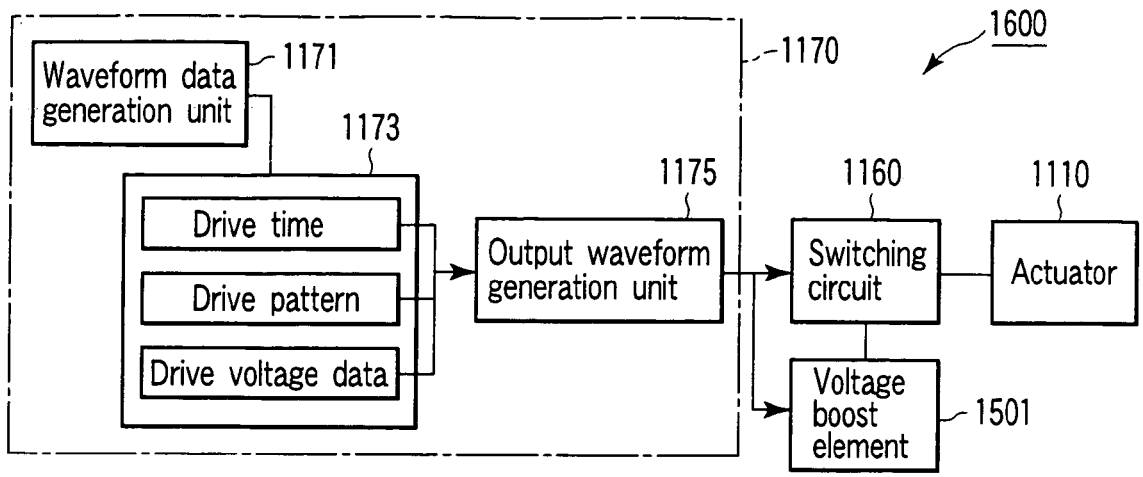
FIG. 36 shows a configuration of the electromechanical transducer into which a waveform output device according to a fifteenth embodiment of the invention is incorporated.
Figure 37:
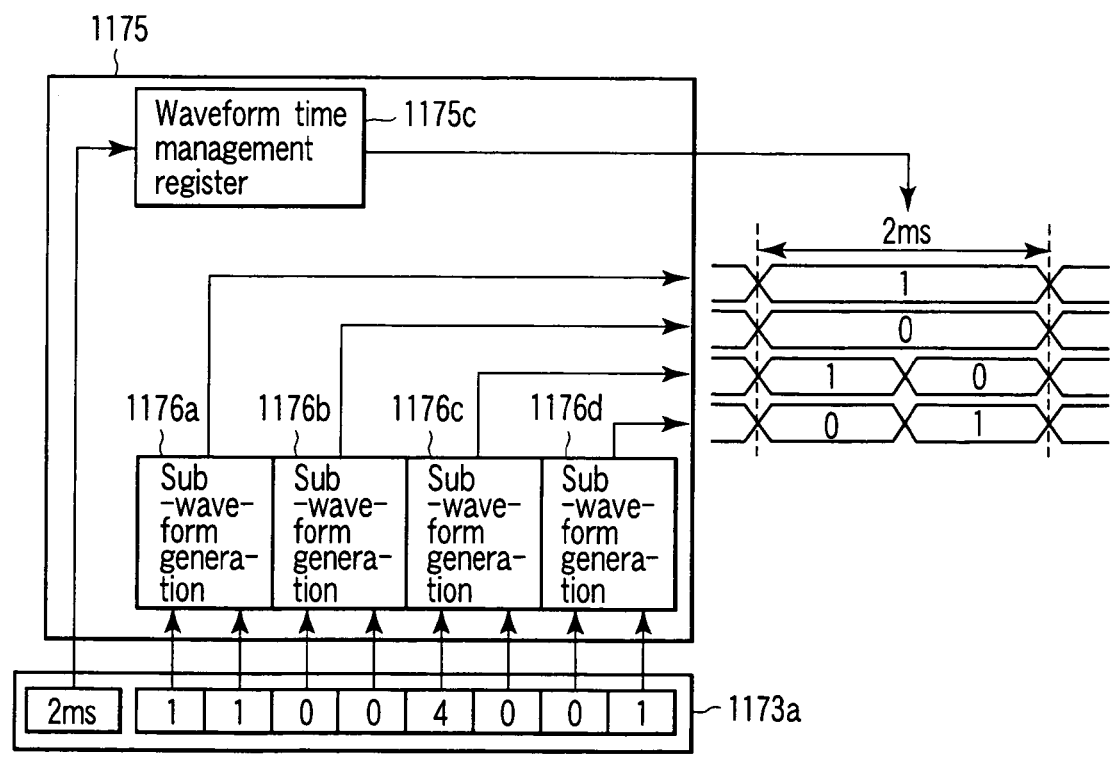
FIG. 37 is an explanatory view showing the principle of waveform generation by the waveform output device according to the fifteenth embodiment of the invention.

FIG. 36 is a block diagram showing the flow of the signal in an electrostatic actuator 1600 according to a fifteenth embodiment of the invention, and FIG. 37 is an explanatory view showing the principle of waveform generation. In FIGS. 36 and 37, the same functional portion as in FIGS. 23 to 25, 34 and 35 is represented by the same reference numeral, and the detail description will be neglected.

The electrostatic actuator 1600 includes the voltage boost element 1501 which applies the voltage corresponding to the inputted resistance value to the switching circuit 1160. The waveform data generation unit 1171 generates the drive time, the drive pattern, and the drive voltage data to input the drive time, the drive pattern, and the drive voltage data to the output waveform generation unit 1175 through the waveform output register 1173.

In the electrostatic actuator 1600 having the above-described configuration, the waveform data generation unit 1171 generates the drive time, drive pattern, and drive voltage data of the actuator 1110 on the basis of the signal input from the outside or the preset program. The drive time, drive pattern, and drive voltage data are stored in the data storage area 1173a. Further, the drive time data is stored in the waveform time management register 1175c.

The drive pattern having eight bits is divided into each drive pattern having two bits, and each drive pattern having two bits is inputted to the sub-waveform generation units 1176a to 1176d. In the sub-waveform generation units 1176a to 1176d, when one output waveform is generated from the drive pattern having two bits, at first the higher-order bit is outputted in the drive pattern having two bits and inputted to the switching circuit 1160. After the unit time has elapsed, the lower-order bit is outputted for the unit time. Namely, when the data of the higher-order bit is equal to the data of the lower-order bit, the data is outputted for the waveform time. When the data of the higher-order bit is different from the data of the lower-order bit, the data is changed for the half of drive time.

By adopting the above-described method, the waveform signal can be generated at the timing finer than the drive time determined by the drive time data.

In accordance with the electrostatic actuator 1600, the same effect as the electrostatic actuator 1100 can be obtained.

Figure 38:
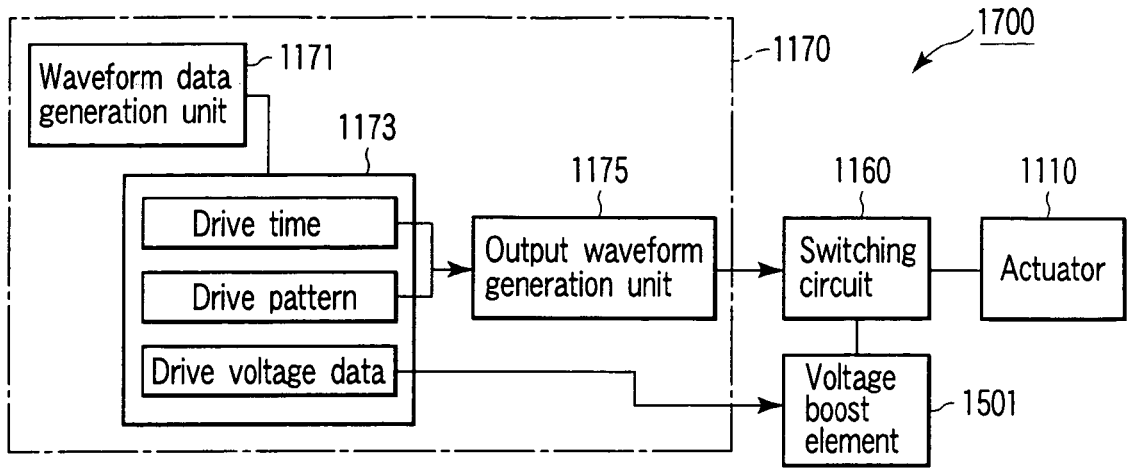
FIG. 38 shows a configuration of the electromechanical transducer into which a waveform output device according to a sixteenth embodiment of the invention is incorporated.
Figure 39:
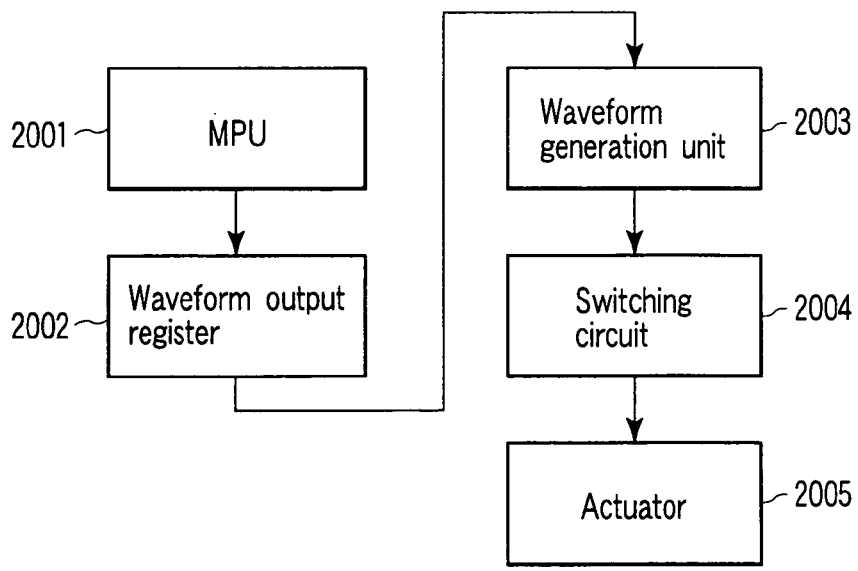
FIG. 39 shows a configuration of the conventional electrostatic actuator.
Figure 40:
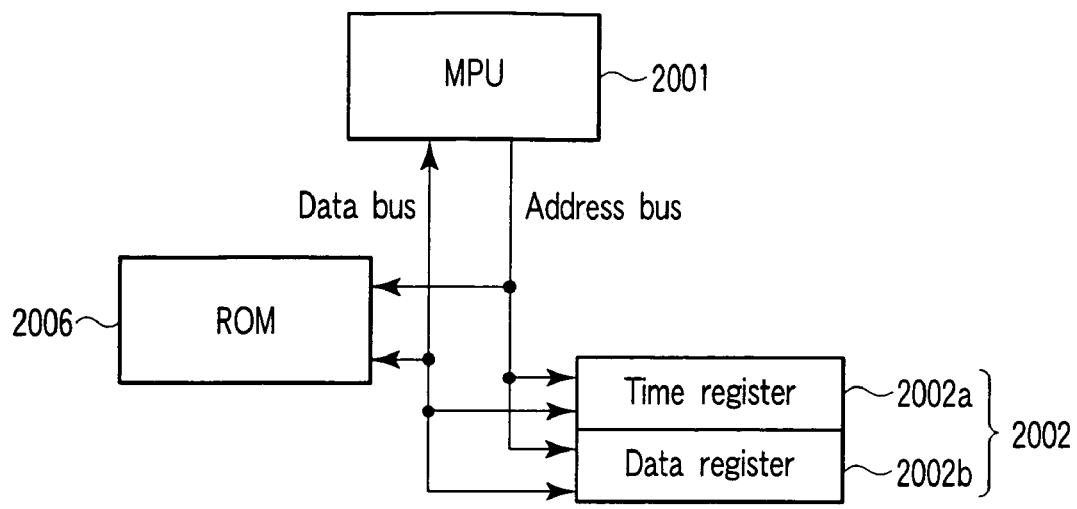
FIG. 40 is an explanatory view showing a method of controlling the conventional electrostatic actuator.
Figure 41:
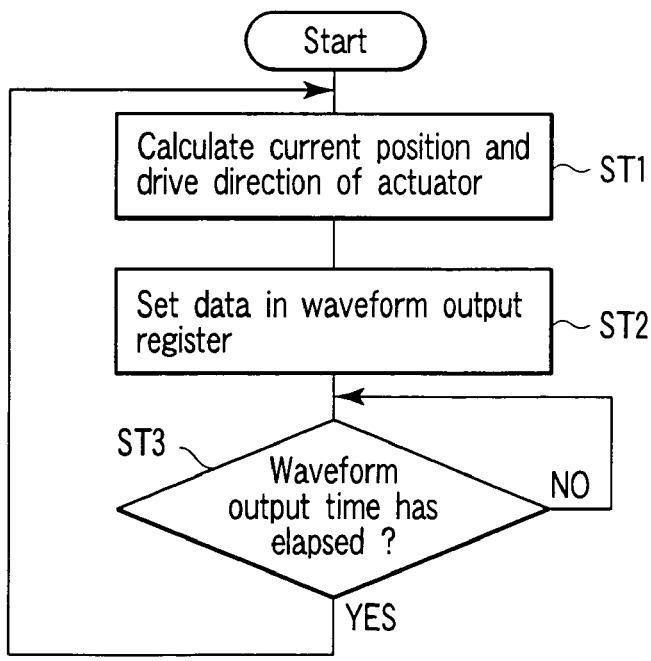
FIG. 41 shows a flow of a sequence for outputting the waveform of the electrostatic actuator.
Figure 42:
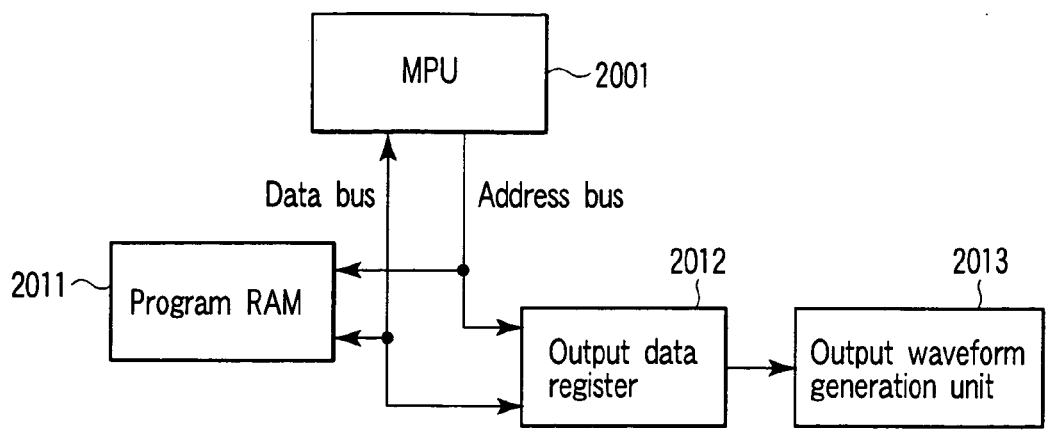
FIG. 42 is an explanatory view showing an example of a control device performing control using waveform signals.
Figure 43:
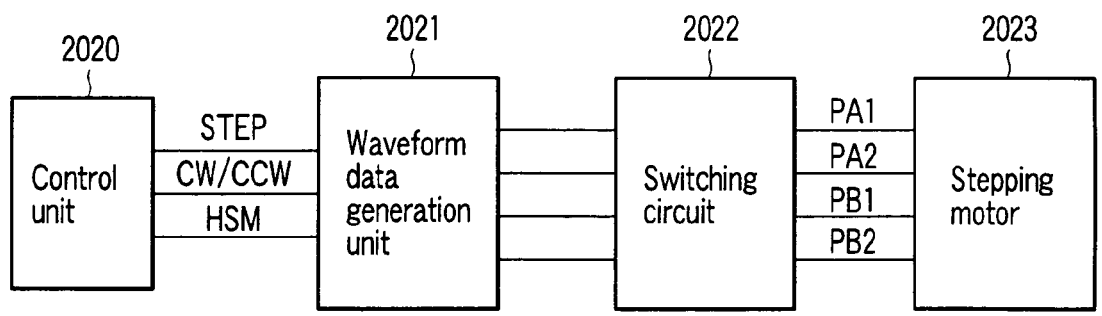
FIG. 43 is an explanatory view showing another example of the control device performing the control using the waveform signals.

FIG. 38 is a block diagram showing the flow of the signal in an electrostatic actuator 1700 according to a sixteenth embodiment of the invention. In FIG. 38, the same functional portion as in FIG. 34 is represented by the same reference numeral, and the detail description will be neglected.

In the electrostatic actuator 1700, the time management of the drive voltage data is not performed, but the drive voltage data is directly outputted to the voltage boost element. In this case, it is impossible that the time management is correctly performed by synchronizing to the drive pattern. However, since the drive voltage data can be controlled by the time management function owned by the waveform data generation unit 1171, the electrostatic actuator 1700 is effective in the case of system in which the drive voltage is controlled only when the sequence such as the driving state and the standby state is largely changed.

While the electrostatic actuator and the piezoelectric actuator were used as an example of the electromechanical transducer in the above-described embodiments, the invention can be applied to other electromechanical transducers. While the drive time data, the drive pattern data, and the drive voltage data were cited as the waveform data, the invention can use various types of data which controls other actuators.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator comprising:
   a stator having an electrode substrate;
   a movable unit having at least one movable element, which is guided by the stator to be able to be reciprocated in a predetermined direction and is provided with an electrode arranged opposite to the electrode substrate;
   a waveform data generation unit which generates waveform data having at least a drive time and a drive pattern on the basis of an operation request from the outside;
   a waveform output register having an output area and a buffer area, which hold the waveform data;
   a waveform data management unit which writes the waveform data generated by the waveform data generation unit in the buffer area, erases the waveform data held in the output area of the waveform output register after the drive time has elapsed, and moves the waveform data held in the buffer area to the output area;

an output waveform generation unit which generates a corresponding waveform signal on the basis of the drive pattern held in the output area of the waveform output register; and a switching circuit which converts the waveform signal into voltage to the electrode substrate.

2. An electrostatic actuator according to claim 1, wherein the buffer area comprises a plurality of sub-buffers, and the waveform data management unit inputs the waveform data from the waveform data generation unit to the sub-buffer of the uppermost stage, outputs the waveform data moved to the output area from the sub-buffer of the lowermost stage, and sequentially moves the waveform data between the plurality of sub-buffers from the uppermost stage toward the lowermost stage.

3. An electrostatic actuator according to claim 1, wherein the waveform data management unit provides a flag specifying a waveform pattern when the waveform pattern generated by the waveform data generation unit is moved to the buffer area, and transmits the flag to the waveform data generation unit when the waveform pattern is moved from the buffer area to the output area.

4. An electrostatic actuator according to claim 1, wherein the buffer area comprises a plurality of sub-buffers, and the waveform data management unit inputs the waveform data from the waveform data generation unit to the sub-buffer directed by a write pointer, outputs the waveform data moved to the output area from the sub-buffer directed by a read pointer, and moves the write pointer and the read pointer in a predetermined order.

5. An electrostatic actuator according to claim 1, wherein the waveform data includes data of output voltage applied to the electrode substrate.

6. A method of driving an electrostatic actuator comprising a stator having an electrode substrate and a movable unit having at least one movable element, which is guided by the stator to be able to be reciprocated in a predetermined direction and is provided with an electrode arranged opposite to the electrode substrate, the method comprising:

generating waveform data having a drive time and a drive pattern on the basis of an operation request from the outside;

holding sequentially the waveform data in an output area and a buffer area;

erasing the waveform data held in the output area after the drive time has elapsed and moving the waveform data held in the buffer area to the output area;

generating a corresponding waveform signal on the basis of the drive pattern held in the output area of the waveform output register; and converting the inputted drive pattern into voltage to the electrode substrate.

7. An electrostatic actuator driving method according to claim 6, wherein the buffer area comprises a plurality of sub-buffers, and the waveform data management step comprises:

inputting the waveform data generated in the waveform data generation step to the sub-buffer of the uppermost stage;

outputting the waveform data moved to the output area from the sub-buffer of the lowermost stage; and sequentially moving the waveform data between the plurality of sub-buffers from the uppermost stage toward the lowermost stage.

8. An electrostatic actuator driving method according to claim 6, wherein the waveform data management step comprises:

providing a flag for specifying a waveform pattern when the waveform data generated in the waveform data generation step is moved to the buffer area; and transmitting the flag when the waveform data is moved from the buffer area to the output area, and generating the waveform data on the basis of the flag transmitted in the transmission step.

9. An electrostatic actuator driving method according to claim 6, wherein the buffer area comprises a plurality of sub-buffers, and the waveform data management step comprises:

inputting the waveform data generated by the waveform data generation unit in the sub-buffer directed by a write pointer;

outputting the waveform data moved to the output area from the sub-buffer directed by a read pointer; and moving the write pointer and the read pointer in a predetermined order.

10. An electrostatic actuator driving method according to claim 6, wherein the waveform data includes data of output voltage applied to the electrode substrate.

11. An electromechanical transducer which generates mechanical drive force by applying voltage, the electromechanical transducer comprising:

a waveform data generation unit which generates waveform data having a drive time and a drive pattern on the basis of an operation request from the outside;

a waveform output register having an output area and a buffer area, which hold the waveform data;

a waveform data management unit which writes the waveform data generated by the waveform data generation unit in the buffer area, erases the waveform data held in the output area of the waveform output register after the drive time has elapsed, and moves the waveform data held in the buffer area to the output area;

an output waveform generation unit which generates a corresponding waveform signal on the basis of the drive pattern held in the output area of the waveform output register; and a switching circuit which converts the waveform signal into voltage to the electromechanical transducer.

12. An electromechanical transducer which generates electrostatic force between a stator and a movable unit having at least one movable element by applying voltage and thereby mechanical drive force is generated in the movable unit, the electromechanical transducer comprising:

a waveform data generation unit which generates waveform data having a drive time and a drive pattern on the basis of an operation request from the outside;

a waveform output register having an output area and a buffer area, which hold the waveform data;

a waveform data management unit which writes the waveform data generated by the waveform data generation unit in the buffer area, erases the waveform data held in the output area of the waveform output register after the drive time has elapsed, and moves the waveform data held in the buffer area to the output area;

an output waveform generation unit which generates a corresponding waveform signal on the basis of the drive pattern held in the output area of the waveform output register; and a switching circuit which converts the waveform signal into voltage to an electrode substrate.

13. An electromechanical transducer which is expanded and compressed by applying voltage, the electromechanical transducer comprising:
- a waveform data generation unit which generates waveform data having a drive time and a drive pattern on the basis of an operation request from the outside;
- a waveform output register having an output area and a buffer area, which hold the waveform data;
- a waveform data management unit which writes the waveform data generated by the waveform data generation unit in the buffer area, erases the waveform data held in the output area of the waveform output register after the drive time has elapsed, and moves the waveform data held in the buffer area to the output area;
- an output waveform generation unit which generates a corresponding waveform signal on the basis of the drive pattern held in the output area of the waveform output register; and
- a switching circuit which converts the waveform signal into voltage to the electromechanical transducer.

* * * * *